United States Patent
Jo et al.

(10) Patent No.: US 11,279,885 B2
(45) Date of Patent: Mar. 22, 2022

(54) CATALYST REGENERATOR

(71) Applicants: KOREA INSTITUTE OF MACHINERY & MATERIALS, Daejeon (KR); KOREA RESEARCH INSTITUTE OF CHEMICAL TECHNOLOGY, Daejeon (KR)

(72) Inventors: Sungkwon Jo, Daejeon (KR); Seongil Choi, Daejeon (KR); Donghyun Cho, Daejeon (KR); Dae-hoon Lee, Daejeon (KR); Kwan-Tae Kim, Daejeon (KR); Younghoon Song, Daejeon (KR); Yong-Ki Park, Seoul (KR); Na Young Kang, Daejeon (KR)

(73) Assignees: KOREA INSTITUTE OF MACHINERY & MATERIALS, Daejeon (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 17/054,345

(22) PCT Filed: May 10, 2019

(86) PCT No.: PCT/KR2019/005644
§ 371 (c)(1),
(2) Date: Nov. 10, 2020

(87) PCT Pub. No.: WO2019/216701
PCT Pub. Date: Nov. 14, 2019

(65) Prior Publication Data
US 2021/0189258 A1   Jun. 24, 2021

(30) Foreign Application Priority Data

May 10, 2018 (KR) .......................... 10-2018-0053736
Jul. 24, 2018 (KR) .......................... 10-2018-0086095
Dec. 21, 2018 (KR) .......................... 10-2018-0167508

(51) Int. Cl.
*C10G 11/18* (2006.01)
*B01J 8/20* (2006.01)
(Continued)

(52) U.S. Cl.
CPC ............. *C10G 11/182* (2013.01); *B01J 8/004* (2013.01); *B01J 8/20* (2013.01); *B01J 8/24* (2013.01);
(Continued)

(58) Field of Classification Search
CPC ... B01J 38/30; B01J 38/24; B01J 38/02; B01J 38/04; B01J 38/10; B01J 38/14;
(Continued)

(56) References Cited

U.S. PATENT DOCUMENTS 4,422,925 A * 12/1983 Williams ............. C10G 11/182
                                                        208/120.01
5,038,562 A     8/1991 Goerlich
(Continued)

FOREIGN PATENT DOCUMENTS

JP    2004-131735 A    4/2004
JP    2004-131736 A    4/2004
(Continued)

OTHER PUBLICATIONS

International Search Report dated Sep. 9, 2019, in connection with corresponding International Patent Application No. PCT/KR2019/005644.

*Primary Examiner* — Lessanework Seifu
(74) *Attorney, Agent, or Firm* — Hauptman Ham, LLP

(57) ABSTRACT

A catalyst regenerator according to an embodiment of the present invention, as a catalyst regenerator that regenerates a coked catalyst separated from a product produced in an
(Continued)

endothermic catalytic reaction of a fluidized bed reactor, includes: a reaction chamber that includes a regeneration space, receives the coked catalyst from a standpipe connected to the regeneration space, and discharges a regenerated catalyst to an outlet; a fuel supplier that is connected to the reaction chamber to inject a fuel for combustion into the regeneration space; and a fuel supplier that is connected to the reaction chamber to inject an air for combustion into the regeneration space, wherein the fuel injected from the fuel supplier is a reformed fuel containing hydrogen and carbon monoxide.

28 Claims, 24 Drawing Sheets

(51) Int. Cl.
    *B01J 38/30* (2006.01)
    *B01J 8/00* (2006.01)
    *B01J 8/24* (2006.01)
    *B01J 38/02* (2006.01)
    *F23C 10/20* (2006.01)
    *F23C 10/22* (2006.01)

(52) U.S. Cl.
    CPC .............. *B01J 38/02* (2013.01); *B01J 38/30* (2013.01); *F23C 10/20* (2013.01); *F23C 10/22* (2013.01); *B01J 2208/00115* (2013.01); *B01J 2208/00176* (2013.01); *B01J 2208/00867* (2013.01); *B01J 2208/00884* (2013.01); *C10G 2300/4081* (2013.01); *C10G 2300/70* (2013.01); *F23C 2900/03002* (2013.01); *F23C 2900/99005* (2013.01)

(58) Field of Classification Search
    CPC ... B01J 8/0015; B01J 8/003; B01J 8/24; B01J 2208/0015; B01J 2208/00176; B01J 2208/00902; B01J 2208/00938; C10G 11/182; F23C 10/20; F23C 10/22; F23C 2900/03002; F23C 2900/99005
    See application file for complete search history.

(56) References Cited

U.S. PATENT DOCUMENTS

| | | | |
|---|---|---|---|
| 7,153,479 B2 | 12/2006 | Peterson et al. | |
| 10,596,564 B2 * | 3/2020 | Lee | B01J 38/04 |

FOREIGN PATENT DOCUMENTS

| | | | |
|---|---|---|---|
| JP | 2008-516033 A | | 5/2008 |
| KR | 10-2011-0084772 A | | 7/2011 |
| KR | 10-2014-0048381 A | | 4/2014 |
| KR | 10-2014-0132730 A | | 11/2014 |
| KR | 10-2014-0140542 A | | 12/2014 |
| KR | 10-2016-0030456 A | | 3/2016 |
| KR | 10-1771163 B1 | | 8/2017 |
| KR | 10-2018-0032472 A | | 3/2018 |
| KR | 10-2019-0129298 A | | 11/2019 |
| WO | WO 2018/056735 | * | 3/2018 |

* cited by examiner

CATALYST REGENERATOR

CROSS REFERENCE TO RELATED APPLICATION

This present application is a national stage filing under 35 U.S.C § 371 of PCT application number PCT/KR2019/005644 filed on May 10, 2019 which is based upon and claims the benefit of priority to Korean Patent Application No. 10-2018-0053736 filed on May 10, 2018, Korean Patent Application No. 10-2018-0086095 filed on Jul. 24, 2018, and Korean Patent Application No. 10-2018-0167508 filed on Dec. 21, 2018 in the Korean Intellectual Property Office. The disclosures of the above-listed applications are hereby incorporated by reference herein in their entireties.

TECHNICAL FIELD

The present invention relates to a catalyst regenerator, and more particularly, to a catalyst regenerator that removes and regenerates carbon of a coked catalyst surface in a fluidized bed reactor using a catalytic decomposition system and increases a temperature of the catalyst.

BACKGROUND ART

In a petrochemical process, a fluidized bed reactor is widely used in a process of producing various compounds by supplying a catalyst in a form of small particles and reacting it in a flow state. It is necessary to recover or replenish heat according to reaction characteristics in the fluidized bed reactor. When replenishment is needed, a fuel is combusted to increase the temperature in the fluidized bed reactor.

As a representative example, there is a process for producing an olefin from naphtha. In this process, the fluidized bed reactor circulates a powder type of catalyst to form a flow field, and induces a catalytic reaction in a specific zone (for example, a riser). The fluidized bed reactor includes a catalyst regenerator, and the catalyst regenerator removes carbon generated on a surface of the catalyst after the catalytic reaction to regenerate the catalyst, and replenishes an amount of heat required for the catalytic reaction.

After a fuel is additionally supplied for removing the carbon from the catalyst surface in the catalyst regenerator and supplementing the amount of heat to be sufficient for the catalytic reaction, and after a temperature of the catalyst in the catalyst regenerator is raised by supplying air into the catalyst regenerator to combust the additional fuel, the heated catalyst is supplied to a riser.

However, when a conventional catalyst regenerator increases the temperature of the catalyst, a hot spot may occur in a reaction chamber by causing a temperature imbalance due to low dispersibility of the fuel. For this reason, there may be a problem that regeneration performance of the catalyst is deteriorated.

In addition, there may be a problem in that the fuel is not sufficiently combusted in a zone in which the catalyst is concentrated in the reaction chamber, and an after-burning phenomenon occurs after the fuel is combusted in a zone in which the catalyst is thin.

DISCLOSURE

Technical Problem

One aspect of the present invention provides a catalyst regenerator that includes an auto-thermal reforming reactor capable of supplying a reformed gaseous fuel (that is, an auto-thermally reformed gaseous fuel) inside the coking catalyst, and that maintains a bubble size of the gaseous fuel to a minimum to accelerate combustion and heat transfer of the reformed gaseous fuel in a catalyst dense zone.

Another aspect of the present invention provides a catalyst regenerator that reforms a liquid fuel having a high calorific value into solid carbon and a gaseous state to supply them to a reaction chamber to regenerate a catalyst in the reaction chamber, and raises a temperature of the catalyst, and in this case, provides a catalyst regenerator that includes a liquid fuel reformer for forming a temperature balance in the reaction chamber.

Another aspect of the present invention provides a catalyst regenerator that stabilizes combustion in a catalyst dense zone during a process of regenerating a coked catalyst to prevent after-burning in the catalyst lean zone.

Technical Solution

An embodiment of the present invention provides a catalyst regenerator for regenerating a coked catalyst separated from a product produced in an endothermic catalytic reaction of a fluidized bed reactor, including: a reaction chamber that includes a regeneration space, receives the coked catalyst from a standpipe connected to the regeneration space, and discharges a regenerated catalyst to an outlet; a fuel supplier that is connected to the reaction chamber to inject a fuel for combustion into the regeneration space; and an air supplier that is connected to the reaction chamber to inject an air for combustion into the regeneration space, wherein the fuel injected from the fuel supplier is a reformed fuel containing hydrogen and carbon monoxide.

The air supplier may include an air distribution ring supplied with air, and an air nozzle formed in the air distribution ring, and the fuel supplier may include a fuel distribution ring supplied with the fuel and disposed to be adjacent to the air distribution ring and a fuel injection port formed in the fuel distribution ring.

The outlet may be installed at a predetermined height from a bottom of the reaction chamber, and the regeneration space may include a catalyst dense zone set at a lower height than the outlet and a catalyst lean zone set at an upper side of the outlet.

The fuel supplier may further include an auto-thermal reforming reactor that is provided with a reforming container in which a reforming catalyst is embedded, and may receive a separated gaseous fuel separated from a product of the endothermic catalytic reaction to auto-thermally reforming-react it in the reforming catalyst.

The auto-thermal reforming reactor may further receive air and water.

The auto-thermal reforming reactor may further receive external gaseous fuel from the outside.

The auto-thermal reforming reactor may include a pilot burner or igniter in the reforming container.

In the auto-thermal reforming reactor, an external combustor supplying a hot combustion product gas may be connected to the reforming container.

The auto-thermal reforming reactor may include a first mixer provided in the reforming container to mix the separated gaseous fuel and the air, a water supplier provided at a downstream side of the first mixer to spray water supplied to the reforming container, and a second mixer that is provided between the reforming catalyst embedded in the reforming container and the water supplier to mix the separated gaseous fuel with the air and the water.

The auto-thermal reforming reactor may include a mixer provided in the reforming container to mix the separated gaseous fuel and the air, and a water supplier provided between the reforming catalyst embedded in the reforming container and the mixer to spray water supplied to the reforming container.

The water supplier may include a heat exchanger exchanging heat inside the reforming container.

The auto-thermal reforming reactor may be installed in the regeneration space.

The reaction chamber may include a perforated plate at the upper side of the fuel distribution ring, and the perforated plate may be provided as a single layer or a multilayer in the catalyst dense zone.

The fuel supplier may include a liquid fuel reformer that is connected to the reaction chamber to generate a reformed gas including hydrogen, carbon monoxide, and solid carbon by partial oxidation of liquid fuel and supply it to the regeneration space.

The liquid fuel reformer may include a housing connected to the reaction chamber, a lean combustion zone in which a first hot gas flow is formed with a first liquid fuel and a first air supplied from one side of the housing, and a rich combustion zone in which a second hot gas flow is formed with a second liquid fuel supplied through a fuel supply pipe installed inside the lean combustion zone.

The catalyst regenerator may further include an inner pipe installed through a spacer interposed inside the housing, in the rich combustion zone.

A first hot gas flow passage that allows the first hot gas to flow may be formed between an outer surface of the inner pipe and an inner surface of the housing, and an inner surface of the inner pipe may form a second hot gas flow passage that allows the second hot gas to flow.

The catalyst regenerator may further include an outer pipe installed outside the housing.

A second air flow passage that allows second air to flow may be formed between an outer surface of the housing and an inner surface of the outer pipe.

The housing may include an extension that is more largely extended in the lean combustion zone than in the rich combustion zone, and a plasma ignition/combustion part that is installed in the extension to generate plasma by a first liquid fuel and first air, and ignites/combusts.

The housing may include a high temperature exposure increasing member installed in the rich combustion zone to increase a high temperature exposure time.

The high temperature exposure increasing member may include at least one of a metal foam, a metal mesh, and a ceramic monolith.

The housing may include a heating member installed on an outer surface thereof to increase an internal temperature thereof.

A plurality of the liquid fuel reformers may be disposed in a lower side of the reaction chamber.

The catalyst regenerator may further include a pre-mixer provided with a pre-mixing zone that is disposed in the catalyst dense zone and pre-mixes a fuel supplied from the fuel supplier and air supplied from the air supplier.

The pre-mixer may be a combustion reactant nozzle that injects a combustion reactant generated in the pre-mixing zone into the catalyst dense zone, the combustion reactant nozzle may include an air nozzle connected to the air injection port and a fuel nozzle connected to the fuel injection port, and the air nozzle and the fuel nozzle may be connected to an inlet side of the pre-mixing zone.

A fuel connection pipe connecting the fuel injection port and the fuel nozzle may be installed to extend from the outside to the inside of the combustion reactant nozzle connected to the air nozzle to inject a fuel into sprayed air.

The fuel pipe may include a porous portion formed around the fuel nozzle.

The combustion reactant nozzle may further include an igniter installed in the pre-mixing zone.

The air distribution ring and the fuel distribution ring may be respectively independently installed inside the reaction chamber.

Advantageous Effects

According to the embodiment of the present invention, an auto-thermal reforming reactor receives a separated gaseous fuel containing methane separated from products of an endothermic catalytic reaction as a main component to perform auto-thermal reforming in a reforming catalyst included in a reforming vessel, and a gaseous fuel supplier injects gaseous fuel reformed with hydrogen and carbon monoxide supplied from an auto-thermal reforming reactor as main components to the catalyst in a regeneration space, thus it is possible to raise a temperature through stable combustion of hydrogen and carbon monoxide even inside a catalyst dense zone of a coked catalyst in a form of small particles.

In addition, according to the embodiment, a perforated plate is provided inside a catalyst regenerator to keep a bubble size of a reformed gaseous fuel to a minimum, so it is possible to accelerate combustion and heat transfer of the reformed gaseous fuel in a catalyst dense zone.

In addition, according to the embodiment, when methane, which is one of gaseous fuels used as a separate gaseous fuel that is reformed by using methane generated as a by-product in fluidized bed reactors of most hydrocarbon fuels (for example, naphtha, propane, etc.), it is possible to reduce a process cost of regenerating a coked catalyst.

According to another embodiment of the present invention, by being provided with a liquid fuel reformer, as a reformed gas containing hydrogen, carbon monoxide, and solid carbon is generated by partial oxidation of a liquid fuel such that the reformed gas is supplied to a regeneration space of a reaction chamber, a coking catalyst may be regenerated, and it is possible to realize a temperature balance in the reaction chamber that increases a temperature of the catalyst.

Therefore, occurrence of hot spots in a reaction chamber and aging of a catalyst are prevented. That is, performance of the catalyst may be maintained.

According to another embodiment of the present invention, since a pre-mixing zone is formed such that combustion reactants including a fuel and air are pre-mixed and reacted to supply the combustion reactants to a catalyst dense zone, after-burning in a catalyst lean zone may be prevented by realizing stable combustion in the catalyst dense zone.

MODE FOR INVENTION

Figure 1:
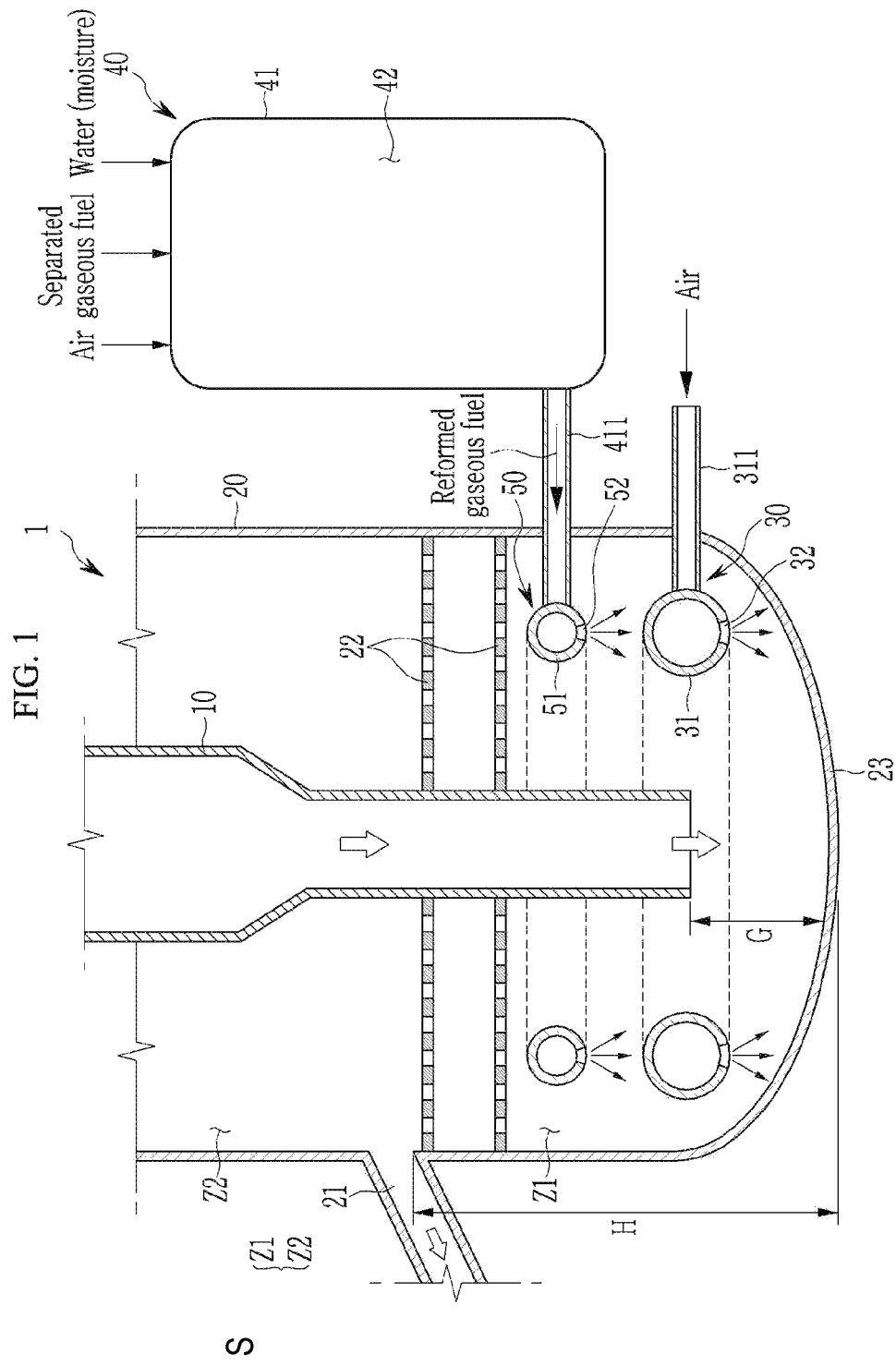
FIG. 1 illustrates a schematic view of a catalyst regenerator according to a first type of a first embodiment of the present invention.

Hereinafter, the present invention will be described with reference to the accompanying drawings. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled (connected, contacted, combined)" to another element, the element may be "directly coupled" to the other element or "indirectly coupled" to the other element through a third element. In addition, unless explicitly described to the contrary, the word "comprise" and variations such as "comprises" or "comprising" will be understood to imply the inclusion of stated elements but not the exclusion of any other elements.

Although not shown, a fluidized bed reactor using a catalytic decomposition system mixes a reactant and a catalyst in a riser (not shown) to cause reactant decomposition, and then separates a coked catalyst and a product by a cyclone to drip the coked catalyst into a catalyst regenerator.

As an embodiment, in a process of producing olefins using naphtha as a reactant, after naphtha and a catalyst are mixed to cause a decomposition reaction of the naphtha, a coked catalyst and a produced olefin are separated in a cyclone (not shown), and the coked catalyst is dripped into a catalyst regenerator (see FIG. 1).

That is, the naphtha is injected into a lower portion of a riser with steam to meet a high temperature catalyst (including a regeneration catalyst), and thus the naphtha begins to be decomposed through catalytic reaction. As the naphtha rises along the riser, it is continuously decomposed through an endothermic catalytic reaction.

After the decomposition reaction of naphtha, the catalyst covered with solid carbon particles, that is, the coking catalyst and the olefin produced by the decomposition reaction, are introduced into a cyclone to be separated from each other. The coked catalyst separated in the cyclone falls into the catalyst regenerator of the embodiment provided thereunder through a standpipe 10 (see FIG. 1).

In the fluidized bed reactor, the catalyst regenerator plays two major roles. The first role is to oxidize a by-product of a catalyst surface that occurs in a main reaction of the fluidized bed reactor in a high temperature environment.

That is, the catalyst regenerator regenerates the coked catalyst. A main component of the by-product formed on the catalyst surface is a carbon particle, and in some cases, it may contain a hydrocarbon-based material that is not removed.

The second role is that when the main reaction of the fluidized bed reactor is an endothermic reaction, it raises a temperature of the catalyst in the catalyst regenerator to supplement the heat required in the main reaction in advance. For example, the main reaction may be naphtha cracking or a dehydration reaction that converts propane into propylene.

In this case, the main reactions are all endothermic reactions. Therefore, in order to supplement additional heat required in the catalyst regenerator, it is necessary to supplement the heat by combusting a fuel.

The catalyst regenerator may be used to simultaneously perform the first and second roles or to achieve only one role.

The catalyst regenerator may be configured to cause an endothermic catalytic reaction in a fluidized bed reactor, to separate the coked catalyst and the product produced, and then to raise the temperature of the coked catalyst or to oxidize by-products of the coked catalyst surface.

The catalyst regenerator according to an embodiment of the present invention may supply a fuel and air to increase the temperature of the coked catalyst by combusting the coked catalyst or to oxidize by-products of the coked catalyst surface, and particularly, may supply a reformed fuel containing hydrogen and carbon monoxide to the coked catalyst by reforming a liquid fuel or a gaseous fuel. Hereinafter, various embodiments of the present invention and numerous variations of each embodiment will be described.

FIG. 1 illustrates a schematic view of a catalyst regenerator according to a first type of a first embodiment of the present invention. Referring to FIG. 1, a first type of catalyst regenerator 1 includes a reaction chamber 20, an air supplier 30, and a fuel supplier. In this case, the fuel supplier may include an auto-thermal reforming reactor 40 and a gaseous fuel supplier 50.

The reaction chamber 20 is configured to set a regeneration space S of a catalyst, to increase a temperature, and to supply a catalyst in which by-products (carbon particles) of a regenerated catalyst, that is, of a coked catalyst surface, is removed to a riser (not shown), through an outlet 21 provided at one side thereof.

The outlet 21 connects the reaction chamber 20 to a lower portion of the riser to supply the regenerated catalyst to the riser. The outlet 21 is installed at a predetermined height H from a bottom of the container 20.

The reaction chamber 20 may be provided with a perforated plate 22 at an upper side of the gaseous fuel supplier 50. Accordingly, the regeneration space S includes a catalyst dense zone Z1 set at a lower height than the outlet 21, and a catalyst lean zone Z2 set at an upper side of the outlet 21.

As an example, the perforated plate 22 may be provided as a single layer or a multilayer in the catalyst dense zone Z1. The perforated plate 22 allows the catalyst regenerated in the catalyst dense zone Z1 to be continuously supplied to the outlet 21 while raising the regenerated catalyst to the catalyst lean zone Z2 and preventing the regenerated catalyst from flowing backward.

The perforated plate 22 is installed inside the reaction container 20 to form a bubbling bed in the regeneration space S, and may allow sizes of a reformed gaseous fuel, a combustion mixture, and a bubble of a reaction product to be kept at a minimum inside the coked catalyst in a powder form.

The air supplier 30 is installed in the regeneration space S to enable combusting of the coked catalyst supplied so as to the regeneration space S and to inject air for the combusting into the regeneration space S. The air supplier 30 injects air to the coked catalyst in the regeneration space S.

The gaseous fuel supplier 50 is installed in the regeneration space S to supply a gaseous fuel for combusting the coked catalyst of the regeneration space S to the regeneration space S. The gaseous fuel supplier 50 injects the reformed gaseous fuel into the air.

Therefore, the air and the reformed gaseous fuel that are injected from the air supplier 30 and the gaseous fuel supplier 50 are combusted in the regeneration space S, and they combust carbon particles of the coked catalyst to regenerate the coked catalyst.

For example, the air supplier 30 includes an air distribution ring 31 and an air injection port 32 installed in the catalyst dense zone Z1. The air distribution ring 31 is formed along a circumferential direction inside the reaction chamber 20, and is disposed in the circumferential direction.

The air injection port 32 is formed in the air distribution ring 31, and is provided downward in the catalyst dense zone Z1 to inject air downward. A plurality of air injection ports 32 are provided, and are spaced apart from each other along a circumferential direction of the air distribution ring 31 to uniformly inject and supply air from the circumferential direction inside the reaction chamber 20. Accordingly, uniform flame and uniform regeneration of the catalyst in the circumferential direction of the catalyst dense zone Z1 are possible.

The gaseous fuel supplier 50 includes a fuel distribution ring 51 and a fuel injection port 52. The fuel distribution ring 51 may be installed to be adjacent to the air distribution ring 31 of the air supplier 30 in the catalyst dense zone Z1, for example, above or below the air distribution ring 31. FIG. 1 illustrates the fuel distribution ring 51 installed above the air distribution ring 31 as an example. The fuel distribution ring 51 is formed along the circumferential direction corresponding to the air distribution ring 31, and is disposed in the circumferential direction.

A plurality of fuel injection ports 52 are provided in the fuel distribution ring 51 to downwardly inject the reformed gaseous fuel into the catalyst dense zone Z1. The fuel injection ports 52 are spaced apart from each other on the fuel distribution ring 51 along the circumferential direction to uniformly inject and supply the reformed gaseous fuel in the circumferential direction of the reaction chamber 20, and thus it may allow uniform flame and uniform regeneration of the catalyst in the circumferential direction of the catalyst dense zone Z1 to be possible.

The reaction chamber 20 forms a bottom 23 to be downwardly convex. That is, it is formed in a concave structure inside the bottom 23. A standpipe 10 supplies a coked catalyst separated from an endothermic catalytic reaction product to the reaction chamber 20, and for this purpose, it is vertically installed at a center of the air distribution ring 31 and the fuel distribution ring 51, in a center of the reaction chamber 20

The air distribution ring 31 is connected to an air pipe 311 to be drawn out to the outside of the reaction chamber 20. However, the standpipe 10 may be installed at various positions other than the center of the reaction chamber 20.

A lower opening of the standpipe 10 forms a predetermined gap G with the bottom 23. Accordingly, the caked catalyst supplied to the opening of the standpipe 10 is supplied to the regeneration space S through the gap G. The concave bottom 23 allows the coked catalyst to be easily changed from downwardly flowing to upwardly flowing, and uniformly distributes the upward flow in the circumferential direction.

The coked catalyst supplied to the standpipe 10 is mixed with the air supplied from the air distribution ring 31, and further mixed with the reformed gaseous fuel supplied from the fuel distribution ring 51.

In this case, the perforated plate 22 maintains the bubble size of the combusted mixture and reaction products of the reformed gaseous fuel at a minimum in the coked catalyst of a form of small particles by the catalyst, air, and reformed gaseous fuel. Therefore, heat transfer and combusting of the reformed gaseous fuel may be accelerated in the catalyst dense zone Z1.

The catalyst dense zone Z1 below the perforated plate 22 in the regeneration space S is set lower than the outlet 21 to intensively combust and regenerate the coked catalyst, and the catalyst lean zone Z2 above the perforated plate 22 is set higher than the outlet 21 to minimize after-burning. In this case, the perforated plate may be provided as a single layer or a multilayer in the catalyst dense zone Z1.

The auto-thermal reforming reactor 40 is supplied with a separated gaseous fuel containing the endothermic catalytic reaction product and separated methane as its main component to perform auto-thermal reforming reaction in a reforming catalyst 42 embedded in a reforming container 41.

The reforming container 41 is connected to the gaseous fuel supplier 50 through a connection pipe 411, and supplies the gaseous fuel reformed in the auto-thermal reforming reactor 40 to the gaseous fuel supplier 50. The reformed gaseous fuel is combusted in the catalyst regenerator 1, and induces an increase in the surface temperature of the coked catalyst to accelerate the combustion of carbon formed on the surface.

The gaseous fuel supplier 50 is connected to the auto-thermal reforming reactor 40, and is installed in the regeneration space S above or below the air supplier 30. The auto-thermal reforming reactor 40 reforms the separated gaseous fuel to supply the reformed gaseous fuel.

The gaseous fuel supplier 50 regenerates the catalyst by injecting the gaseous fuel reformed with hydrogen and carbon monoxide supplied from the auto-thermal reforming reactor 40 as main components to the coked catalyst in the regeneration space S.

Meanwhile, the auto-thermal reforming reaction requires a separated gaseous fuel, which is a reactant, and air and water (moisture). Therefore, the auto-thermal reforming reactor 40 may receive more air and water (moisture) in addition to the separated gaseous fuel.

The moisture may increase durability of the reforming catalyst 42 by controlling the temperature in the catalyst reaction of the reforming catalyst 42 in the auto-thermal reforming reactor 40 and removing carbon generated on the surface of the reforming catalyst 42.

In a typical partial oxidation catalytic reforming reaction, gaseous methane and air, which are reacted materials, are reacted to produce hydrogen and carbon monoxide. However, the partial oxidation catalytic reforming reaction causes reduction of catalyst performance and clogging of pipes due to carbon generation on the surface of the catalyst.

In contrast, in the first embodiment, the auto-thermal reforming reaction of the auto-thermal reforming reactor 40 is performed at a 0.5 to 1.0 ratio of $O_2/CH_4$, which is the same or higher than a partial oxidation condition, which is a 0.5 ratio of $O_2/CH_4$.

Compared to the general partial oxidation catalytic reforming reaction, the auto-thermal reforming reaction according to the first embodiment additionally supplies water (moisture) to the partial oxidation catalytic reforming reaction to have the advantage of additionally removing carbon, through the supply of the heat source for the catalytic reaction and the reaction of moisture and carbon, and through additional hydrogen generation and carbon combustion.

After causing the endothermic catalytic reaction in the fluidized bed reactor, the separated gaseous fuel is reused and reformed through the auto-thermal reforming reaction of the auto-thermal reforming reactor 40, and the reformed gaseous fuel containing hydrogen and carbon monoxide as main components is supplied to the inside of the catalyst regenerator 1 to be combusted with carbon particles on the coked catalyst surface.

The first embodiment eliminates the need for additional heat sources or electric power through the auto-thermal reforming reaction, so it is possible to operate the catalyst regenerator with a minimum of energy.

Hereinafter, various types of the first embodiment of the present invention will be described. By comparing types described below with the previously described types, the same configurations will be omitted, and different configurations will be described.

Figure 2:
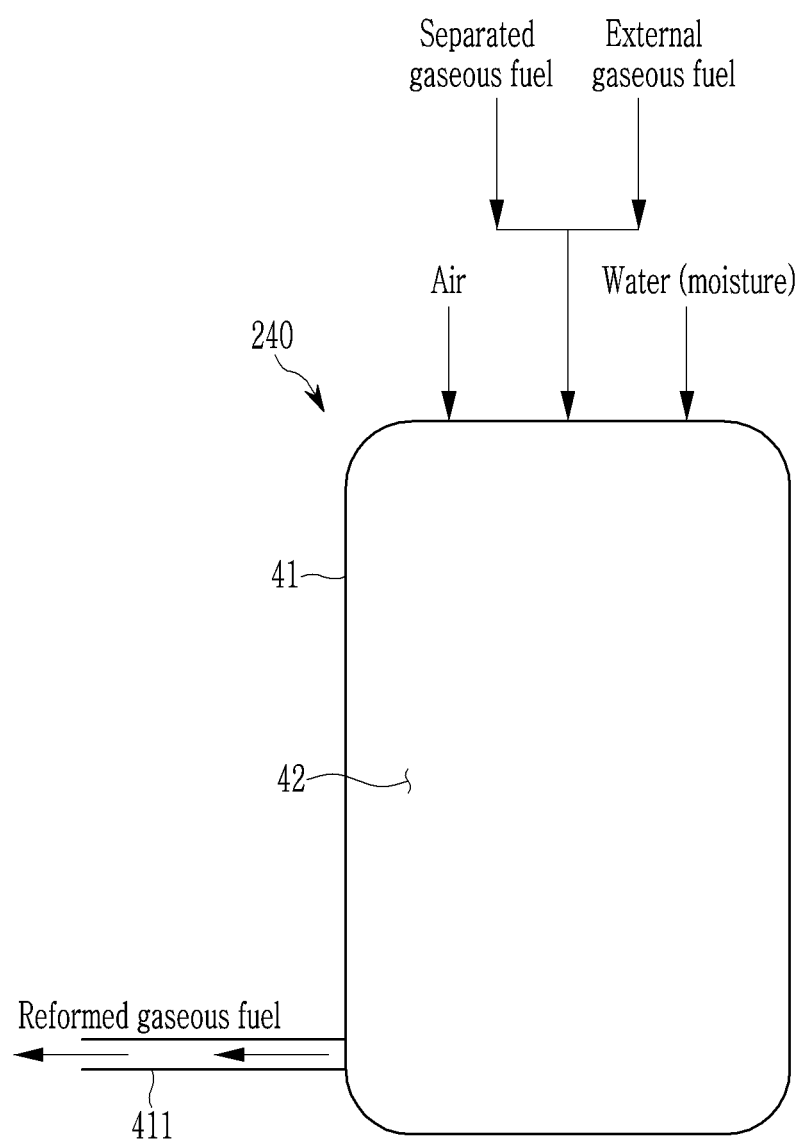
FIG. 2 illustrates a schematic view of an auto-thermal reforming reactor applied to a catalyst regenerator according to a second type of a first embodiment of the present invention.

FIG. 2 illustrates a schematic view of an auto-thermal reforming reactor applied to a catalyst regenerator according to a second type of a first embodiment of the present invention. Referring to FIG. 2, an auto-thermal reforming reactor 240 applied to the second type of catalyst regenerator is further supplied with an external gaseous fuel (for example, methane, which is not a separated gaseous fuel) from the outside of the reforming container 41 compared to the structure of the auto-thermal reforming reactor 40 of the first embodiment that is supplied with the separated gaseous fuel. That is, the separated gaseous fuel and external gaseous fuel are supplied to the reforming container 41.

The auto-thermal reforming reaction of the auto-thermal reforming reactor 240 is performed in a condition in which the partial oxidation condition of the separated gaseous fuel and external gaseous fuel is higher than the $O_2/CH_4$ ratio of 0.5, and the combustion condition thereof is lower than an $O_2/CH_4$ ratio of 2.0 to perform the partial combustion reaction of the separated gaseous fuel (for example, methane) and the external gaseous fuel.

In this case, the generated heat is utilized as a heat source of the reforming catalyst 42. Water (moisture) that is additionally supplied reacts with carbon to suppress formation of carbon on the surface of the reforming catalyst 42, or reacts with methane to generate hydrogen and carbon dioxide.

The gaseous fuel reformed from the separated gaseous fuel and the external gaseous fuel in the auto-thermal reforming reactor 240 are supplied to the inside of the catalyst regenerator 1 through the connection pipe 411 to be combusted with the carbon particles on the coked catalyst surface.

Figure 3:
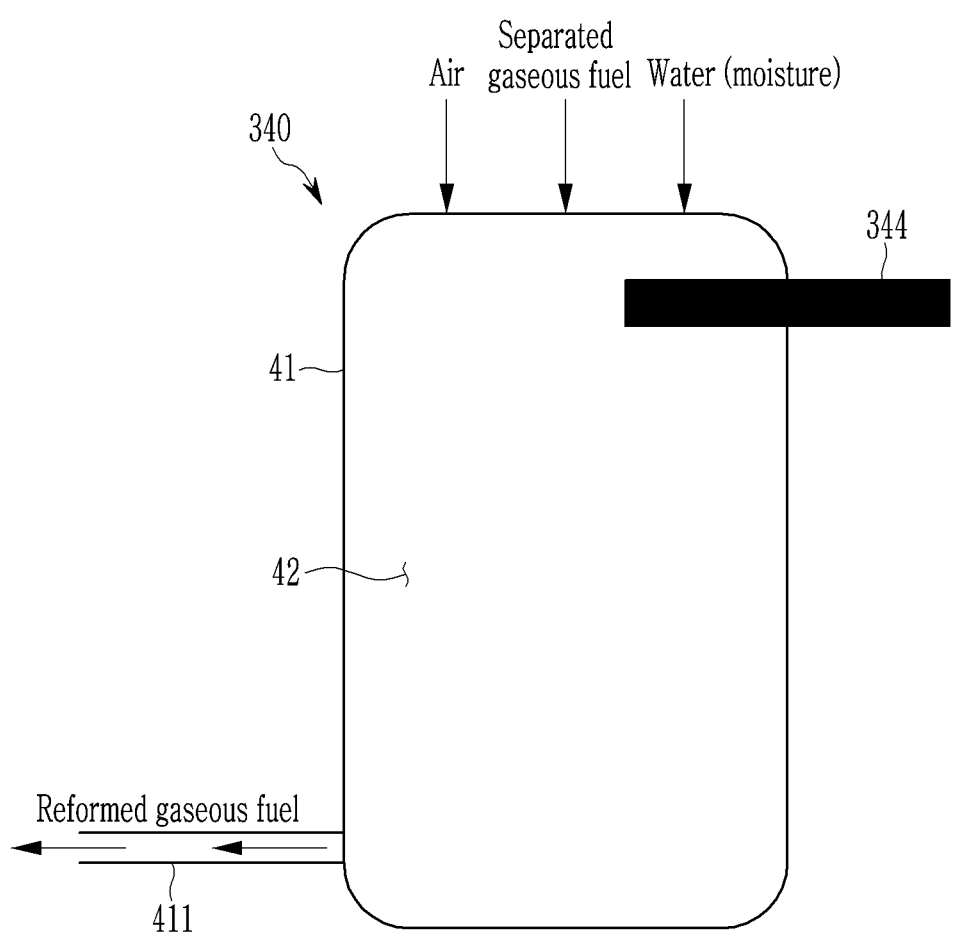
FIG. 3 illustrates a schematic view of an auto-thermal reforming reactor applied to a catalyst regenerator according to a third type of a first embodiment of the present invention.
Figure 4:
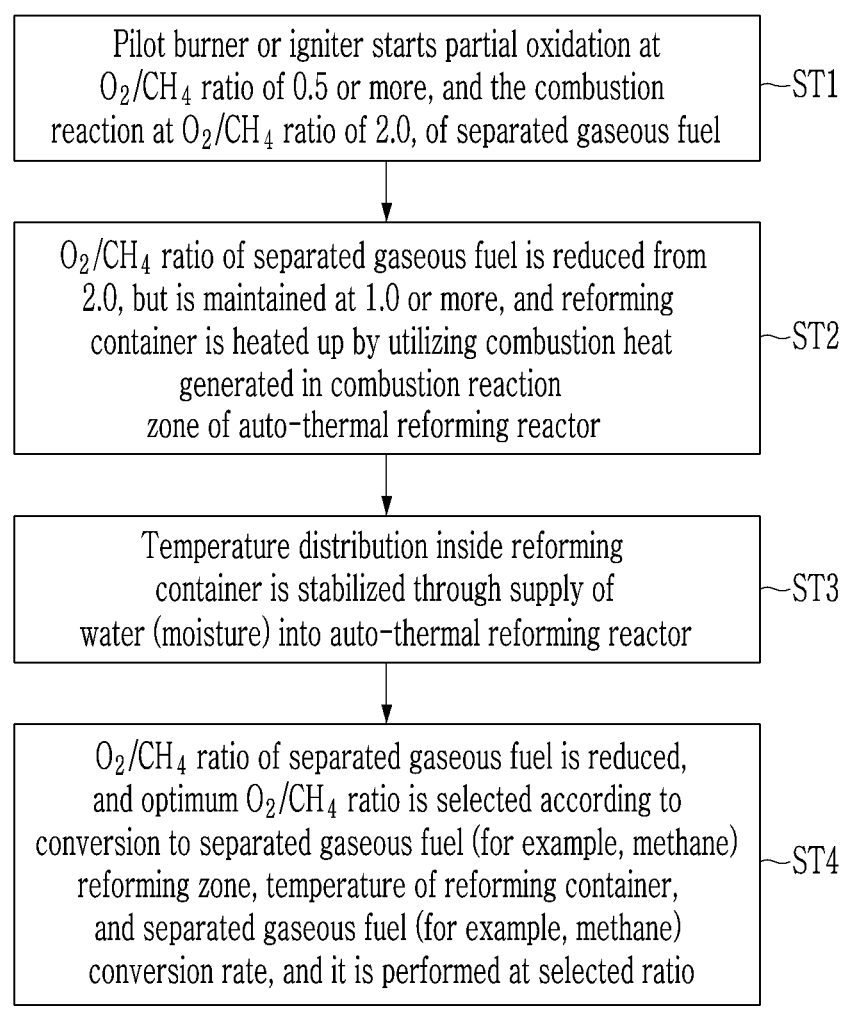
FIG. 4 illustrates a flowchart of driving of an auto-thermal reforming reactor applied to FIG. 3.

FIG. 3 illustrates a schematic view of an auto-thermal reforming reactor applied to a catalyst regenerator according to a third form of a first embodiment of the present invention, and FIG. 4 illustrates a flowchart of driving of an auto-thermal reforming reactor applied to FIG. 3. Referring to FIG. 3 and FIG. 4, an auto-thermal reforming reactor 340 applied to the third type of catalyst regenerator has a structure in which a pilot burner or igniter 344 is added to the reforming container 41 of the structure of the first type auto-thermal reforming reactor 40.

The pilot burner or igniter 344 is provided inside (at an upper side) of the reforming container 41 to start the combustion reaction at an $O_2/CH_4$ ratio of 2.0.

A driving sequence of the auto-thermal reforming reactor 340 includes a first step ST1, a second step ST2, a third step ST3, and a fourth step ST4. The first step ST1 uses the pilot burner or igniter 344 to start the combustion reaction at an $O_2/CH_4$ ratio of 2.0.

In the second step ST2, the $O_2/CH_4$ ratio of the separated gaseous fuel is gradually reduced from 2.0, but is maintained at 1.0 or more, and the inside of the reforming container 41 is heated up by utilizing the combustion heat generated in the combustion reaction zone of the auto-thermal reforming reactor 340.

In the third step ST3, the temperature distribution inside the reforming container 41 is stabilized through the supply of water (moisture) into the auto-thermal reforming reactor 340.

In the fourth step ST4, the $O_2/CH_4$ ratio of the separated gaseous fuel is gradually reduced, and an optimum $O_2/CH_4$ ratio is selected according to the conversion to the separated gaseous fuel (for example, methane) reforming zone, the temperature of the reforming container 41, and the separated gaseous fuel (for example, methane) conversion rate, and the fourth step ST4 is performed at the selected ratio.

That is, the auto-thermal reforming reactor 340 supplies the reformed gas reformed from the separated gaseous fuel (for example, methane) to the catalyst regenerator 1 through the connection pipe 411. The supplied reformed gas is combusted with the carbon particles of the catalyst coked inside the catalyst regenerator.

Figure 5:
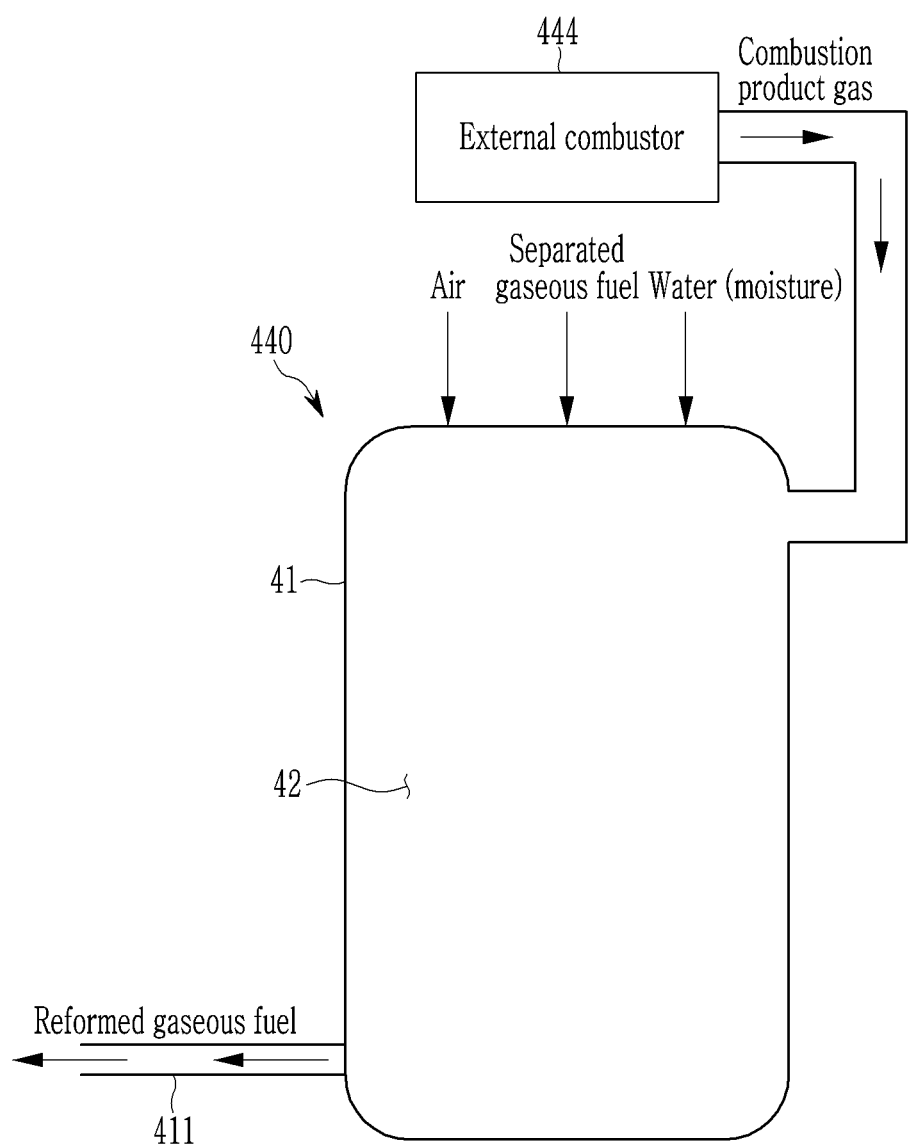
FIG. 5 illustrates a schematic view of an auto-thermal reforming reactor applied to a catalyst regenerator according to a fourth type of a first embodiment of the present invention.
Figure 6:
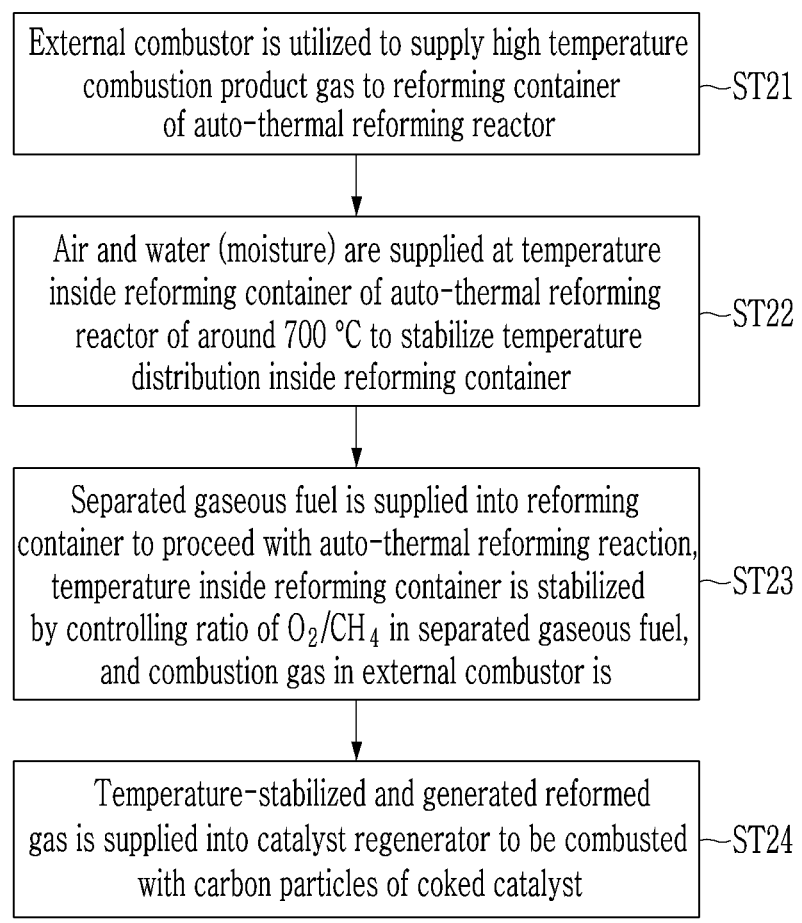
FIG. 6 illustrates a driving flowchart of an auto-thermal reforming reactor applied to FIG. 5.

FIG. 5 illustrates a schematic view of an auto-thermal reforming reactor applied to a catalyst regenerator according to a fourth type of a first embodiment of the present invention, and FIG. 6 illustrates a flowchart of driving of an auto-thermal reforming reactor applied to FIG. 5. Referring to FIG. 5 and FIG. 6, an auto-thermal reforming reactor 440 applied to the fourth type catalyst regenerator has a structure in which an external combustor 444 is further connected to the reforming container 41 of the auto-thermal reforming reactor 40 of the first embodiment.

The external combustor 444 is connected to the reforming container 41 to supply a high temperature combustion product gas to the inside of the reforming container 41.

A driving sequence of the auto-thermal reforming reactor 440 includes a first step ST21, a second step ST22, a third step ST23, and a fourth step ST24. In the first step ST21, the external combustor 444 is utilized to supply the high temperature combustion product gas to the inside of the reforming container 41 of the auto-thermal reforming reactor 440.

In the second step ST22, air and water (moisture) are supplied at a temperature inside the reforming container 41 of the auto-thermal reforming reactor 440 of around 700° C. to stabilize the temperature distribution inside the reforming container 41.

In the third step ST23, the separated gaseous fuel is supplied into the reforming container 41 to proceed with an auto-thermal reforming reaction, the temperature inside the reforming container 41 is stabilized by controlling the ratio of $O_2/CH_4$ in the separated gaseous fuel, and the combustion gas in the external combustor 444 is blocked.

In the fourth step ST24, the temperature-stabilized and generated reformed gas is supplied to the inside of the catalyst regenerator 1 through the connection pipe 411 to be combusted with the carbon particles of the coked catalyst.

Figure 7:
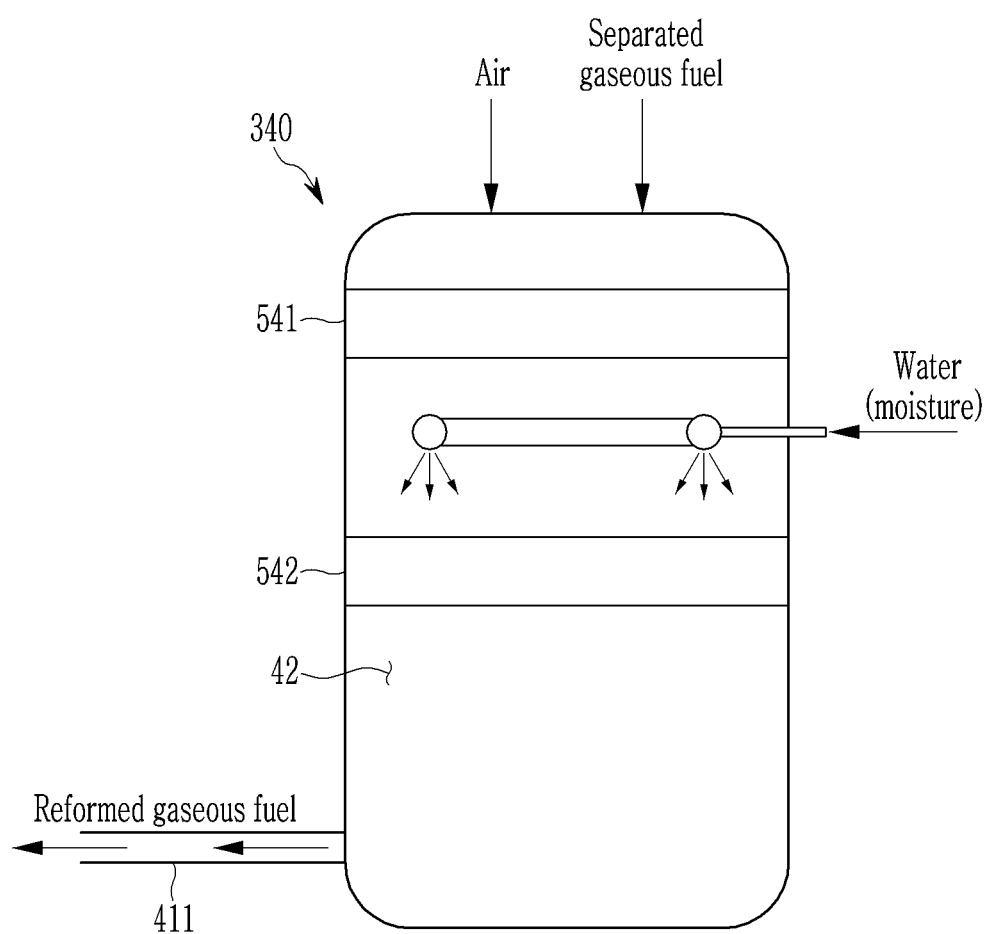
FIG. 7 illustrates a schematic view of an auto-thermal reforming reactor applied to a catalyst regenerator according to a fifth type of a first embodiment of the present invention.

FIG. 7 illustrates a schematic view of an auto-thermal reforming reactor applied to a catalyst regenerator according to a fifth type of a first embodiment of the present invention. Referring to FIG. 7, an auto-thermal reforming reactor 340 applied to the fifth type of catalyst regenerator includes a reforming container 41, a first mixer 541, a water supplier 543, and a second mixer 542.

The first mixer 541 is provided inside (an upper side) of the reforming container 41, and mixes the separated gaseous fuel supplied (from the upper side) with air to allow a uniform combustion reaction to be started inside the reforming container 41.

The water supplier 543 is provided in a downstream side of the first mixer 541 to spray water (moisture) supplied to the reforming container 41 (supplied from a lateral side of the reforming container 41) to the inside of the reforming container 41. The water supplier 543 uniformly supplies the water (moisture) into the reforming container 41, and stabilizes the temperature distribution inside the reforming container 41 through the water (moisture) supply.

The second mixer 542 is provided between an upstream side of the reforming catalyst 42 inside (or, at a lower portion of) the reforming container 41 and the water supplier 543, and uniformly mixes the separated gaseous fuel, air, and water (moisture) to supply it to the embedded reforming catalyst 42, thus a uniform catalyst reaction of the reforming catalyst 42 is possible. The reformed gas is supplied to the inside of the catalyst regenerator 1 through the connection pipe 411 to be combusted with the carbon particles of the coked catalyst.

Figure 8:
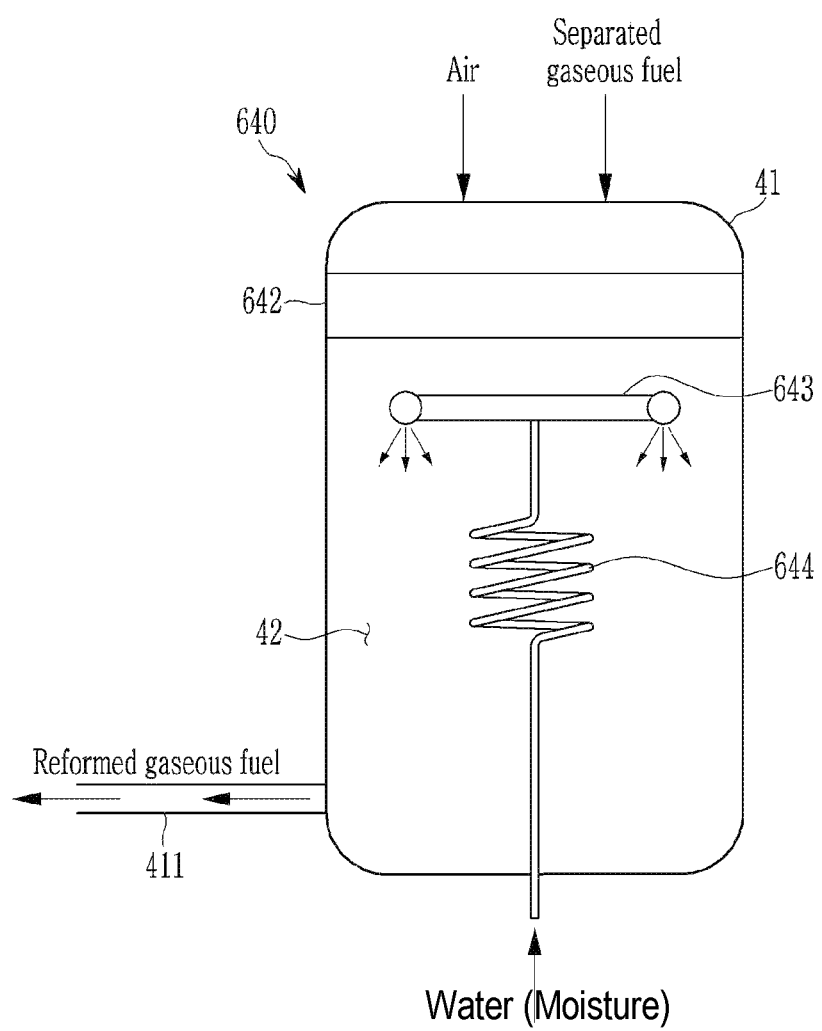
FIG. 8 illustrates a schematic view of an auto-thermal reforming reactor applied to a catalyst regenerator according to a sixth type of a first embodiment of the present invention.

FIG. 8 illustrates a schematic view of an auto-thermal reforming reactor applied to a catalyst regenerator according to a sixth type of a first embodiment of the present invention. Referring to FIG. 8, an auto-thermal reforming reactor 640 applied to the sixth type of catalyst regenerator includes a reforming container 41, a mixer 642, and a water supplier 643.

The mixer 642 is provided inside (an upper side of) the reforming container 41, and mixes the separated gaseous fuel supplied from an upstream side with air to allow a uniform combustion reaction to be be started inside the reforming container 41.

The water supplier 643 is provided between an upstream side of the reforming catalyst 42 embedded in (a lower portion of) the reforming container 41 and the mixer 642 to spray water (moisture) supplied to the reforming container 41 (supplied from the lower portion of the reforming container 41) to stabilize the temperature distribution inside the reforming container 41.

In addition, the water supplier 643 uniformly supplies water (moisture) inside the reforming container 41, and uniformly mixes the separated gaseous fuel, air, and water (moisture) to supply the uniform mixture to the embedded reforming catalyst 42, thus a uniform catalyst reaction of the reforming catalyst 42 is possible.

The water supplier 643 further includes a heat exchanger 644 that is connected to a downstream side of the reforming container 41 and exchanges heat in a wide area inside of the reforming container 41. The heat exchanger 644 may more uniformly form the temperature distribution of the reforming catalyst 42 inside the reforming container 41 by the heat exchanging action in the reforming container 41, and enables a uniform catalyst reaction of the reforming catalyst 42.

Figure 9:
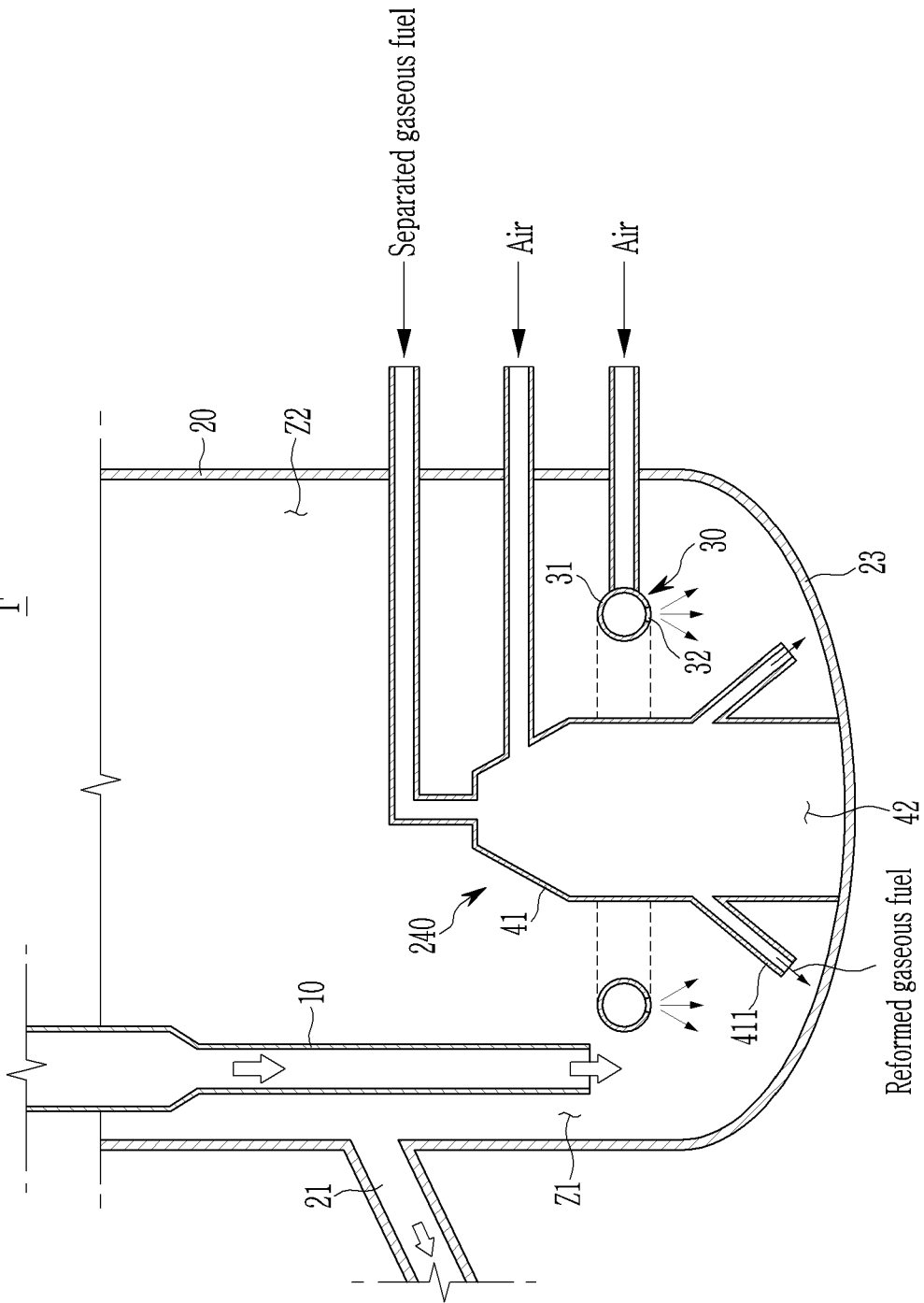
FIG. 9 illustrates a schematic view of a catalyst regenerator according to a seventh type of a first embodiment of the present invention.

FIG. 9 illustrates a schematic view of a catalyst regenerator according to a seventh type of a first embodiment of the present invention. Referring to FIG. 9, an auto-thermal reforming reactor 240 applied to a seventh type of catalyst regenerator 1' may be installed inside the reaction chamber 20, for example, in the catalyst dense zone Z1. In this case, the auto-thermal reforming reactor 240 may be supported on the bottom 23 of the reaction chamber 20 as shown in FIG. 9, and may be disposed in the center of the reaction chamber 20.

The reforming container 41 of the auto-thermal reforming reactor 240 receives separated gaseous fuel, air, and water (not shown) through a pipe connected to the outside, and sprays the reformed gaseous fuel on the coked catalyst in the regeneration space S through the connection pipe 411 connected to the reforming container 41 to regenerate the catalyst. In this case, a plurality of connection pipes 411 may be provided, and may be disposed at uniform intervals in the circumferential direction of the reforming container 41.

Although not shown in the drawing, the connection pipe 411 is connected to the fuel distribution ring 51 in the same manner as in the above-described first type, so that the reformed gaseous fuel may be injected through the fuel injection port 52 formed in the fuel distribution ring 51.

Meanwhile, since the reforming reaction occurring in the auto-thermal reforming reactor 240 is an exothermic reaction, heat may be supplied from the auto-thermal reforming reactor 240. Accordingly, in the case of the seventh type of the first embodiment of the present invention, the auto-thermal reforming reactor 240 is installed inside the reaction chamber 20, not outside thereof, thereby improving the heat efficiency of the catalyst regeneration and heating process occurring in the regeneration space S.

Hereinafter, a second embodiment of the present invention will be described. The second embodiment includes a liquid fuel reformer as a fuel supplier for supplying the reformed fuel.

Figure 10:
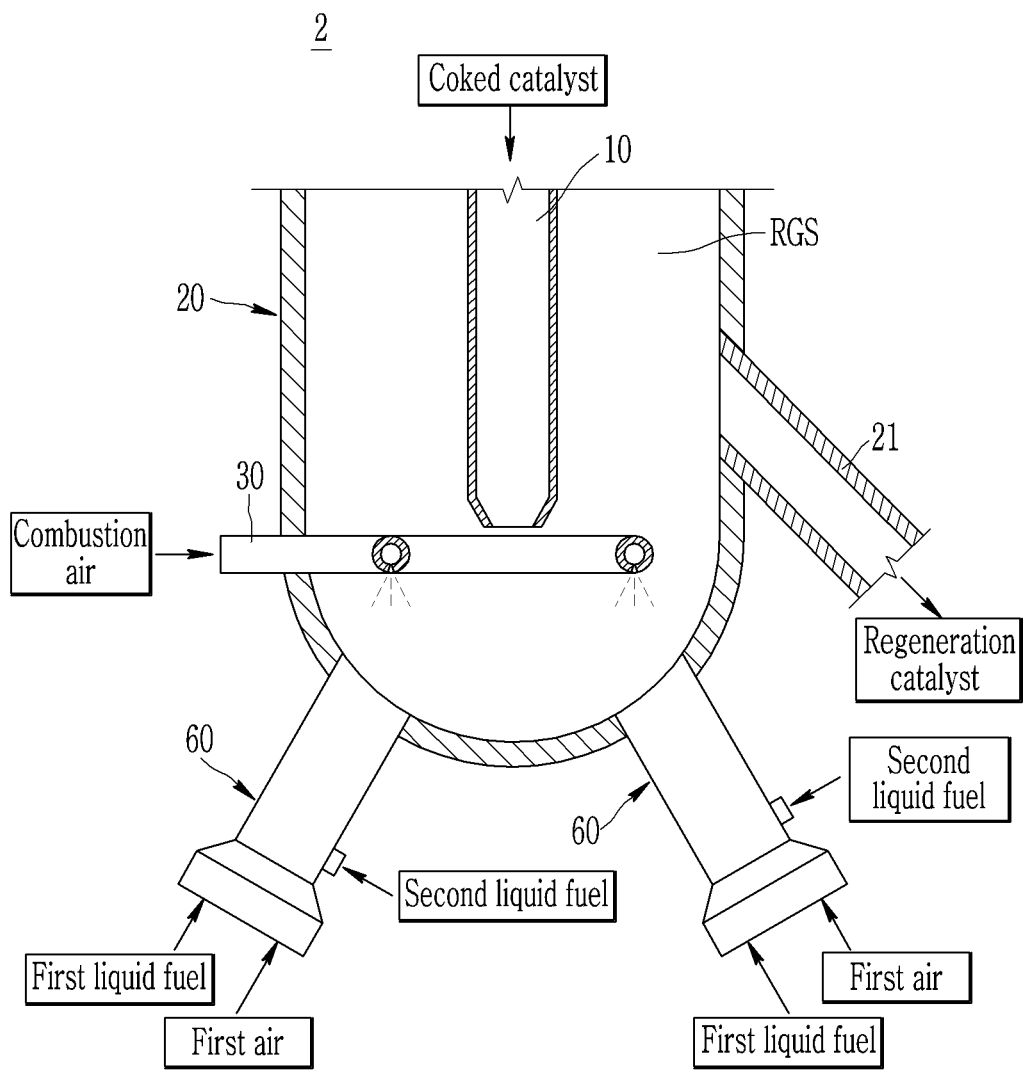
FIG. 10 illustrates a cross-sectional view of a catalyst regenerator according to a second embodiment of the present invention.

FIG. 10 illustrates a cross-sectional view of a catalyst regenerator including a liquid fuel reformer applied to a first type of a second embodiment of the present invention. Referring to FIG. 10, a catalyst regenerator 2 of the first type of the second embodiment includes a reaction chamber 20, a fuel supplier, and an air supplier 30 to be configured to regenerate and heat the coked catalyst. In this case, the fuel supplier is configured of a liquid fuel reformer 60.

The catalyst regenerator 2 of the second embodiment is configured to form a temperature balance in the reaction chamber 20 by reforming the (first and second) liquid fuels with high calorific value into a solid carbon and a gaseous state to supply it to the reaction chamber 20.

The catalyst regenerator 2 of the second embodiment regenerates and heats the catalyst while oxidizing and removing carbon remaining on the surface of the coked catalyst with air additionally supplied to the solid carbon and the reformed gas of the gaseous state (hydrogen, carbon monoxide).

The liquid fuel reformer 60 is configured to partially oxidize the first and second liquid fuels to generate reformed gas including hydrogen, carbon monoxide, and solid carbon and supply it to the regeneration space S.

The air supplier 30 is installed in the regeneration space S inside the reaction chamber 20 to combust the reformed gas, and supplies air for combusting in the regeneration space S so as to regenerate and heat the coked catalyst.

Figure 11:
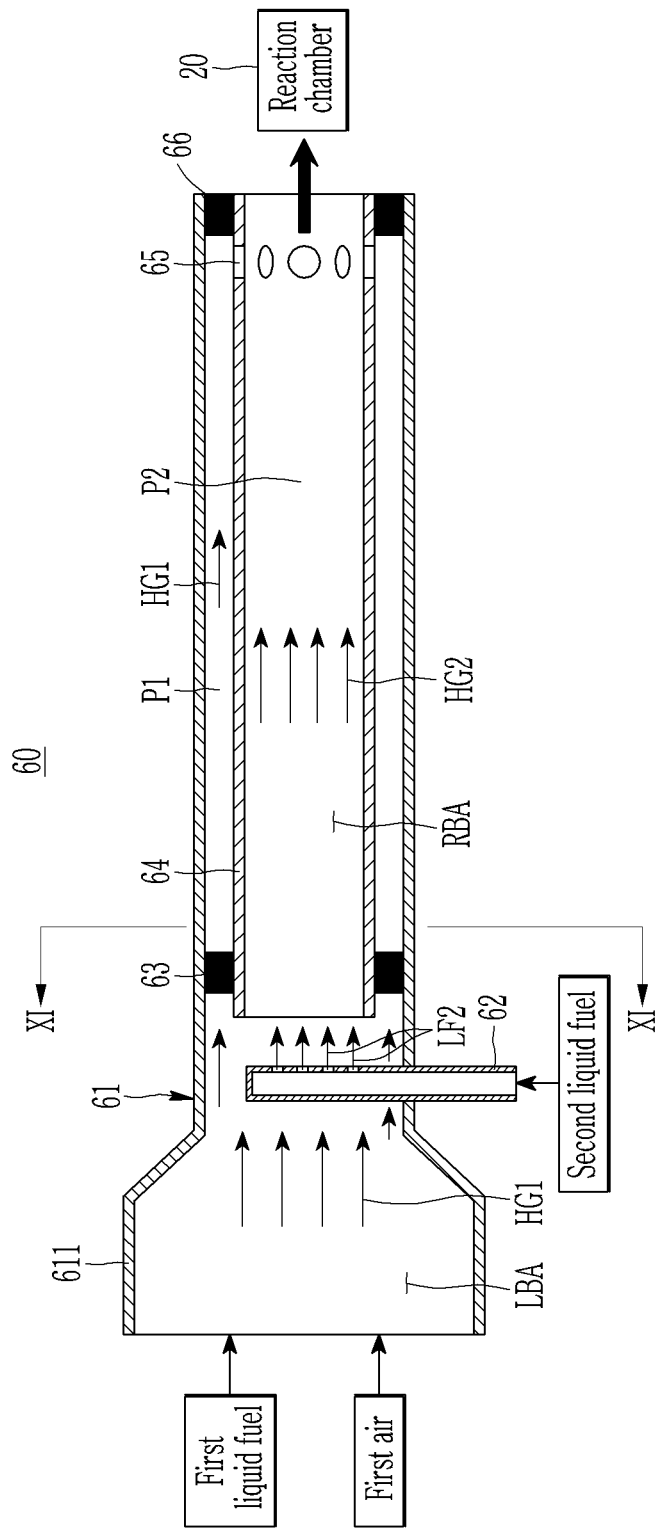
FIG. 11 illustrates a cross-sectional view of a liquid fuel reformer applied to FIG. 10.
Figure 12:
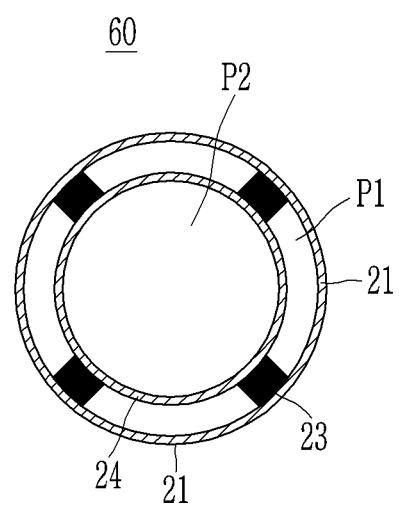
FIG. 12 illustrates a cross-sectional view taken along line XI-XI of FIG. 11.

FIG. 11 illustrates a cross-sectional view of a liquid fuel reformer applied to FIG. 10, and FIG. 12 illustrates a cross-sectional view taken along line XI-XI of FIG. 11. Referring to FIG. 11 and FIG. 12, the liquid fuel reformer 60 includes a housing 61, a lean combustion zone LBA, and a rich combustion zone RBA.

The housing 61 is connected to the reaction chamber 20 to supply the reformed gas produced by partial oxidation to the regeneration space S in the reaction chamber 20. In the lean combustion zone LBA, a flow of a first hot gas HG1 is formed with the first liquid fuel and the first air supplied from one side of the housing 61. The flow of the first hot gas HG1 is formed by the normal combustion of the first liquid fuel and first air.

In the rich combustion zone RBA, flow of a second hot gas HG2 is formed with a second liquid fuel LF2 supplied through a fuel supply pipe 62 installed inside the lean combustion zone LBA. The second liquid fuel LF2 supplied through the fuel supply pipe 62 is supplied to the flow of the first hot gas HG1 to be partially oxidized due to lack of air.

The housing 61 includes an extension 611 of which cross-sectional area is extended more than in the lean combustion zone LBA than in the rich combustion zone RBA. Accordingly, the housing 61 greatly increases a supply amount of the first air compared to that of the first liquid fuel in the lean combustion zone LBA through the expansion 611, thereby enabling more complete lean combustion to generate and supply the first hot gas.

Figure 13:
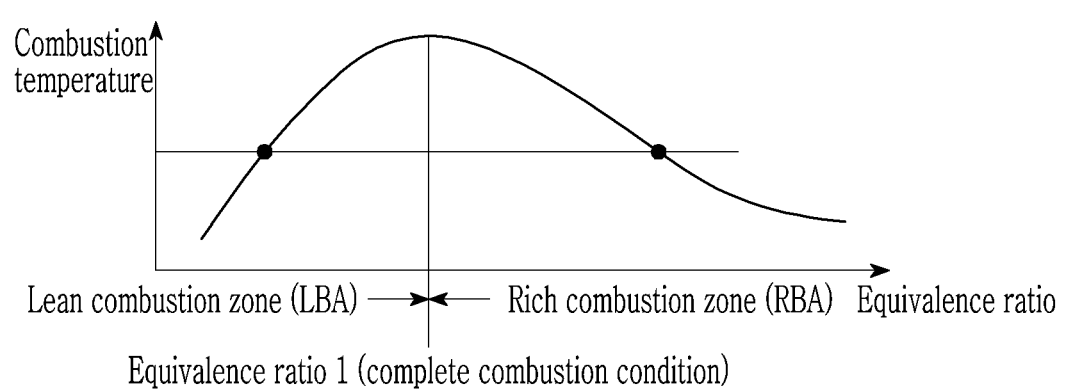
FIG. 13 illustrates a graph of a relationship between an equivalence ratio and temperature with respect to lean and rich combustion zones of a liquid fuel reformer of FIG. 11.

FIG. 13 illustrates a graph of a relationship between an equivalence ratio and temperature with respect to lean and rich combustion zones of a liquid fuel reformer of FIG. 11. Referring to FIG. 13, the flow of the second hot gas HG2 is formed by partial oxidation of the first hot gas and the second liquid fuel LF2. Therefore, the rich combustion zone RBA is combusted with a higher equivalence ratio than that in the lean combustion zone LBA.

In the lean combustion zone LBA, the equivalence ratio and combustion temperature are approximately proportional, and in the rich combustion zone RBA formed after supplying the second liquid fuel LF2 through the fuel supply pipe 62, the equivalence ratio and combustion temperature are approximately inversely proportional.

In this case, due to partial oxidation of the second liquid fuel LF2, a reformed gas including hydrogen, carbon monoxide, and solid carbon is produced. Therefore, the reformed gas containing solid carbon is supplied to the reaction chamber 20 through a second hot gas flow passage P2 set inside an inner pipe 64.

Referring back to FIG. 11 and FIG. 12 specifically, the inner pipe 64 installed with a spacer 63 inside the housing 61 in the rich combustion zone RBA is included. A plurality of the spacers 63 are provided, and are disposed apart from each other on an inner surface of the housing 61 and on an outer surface of the inner pipe 64 along the circumferential direction.

Therefore, the outer surface of the inner pipe 64 and the inner surface of the housing 61 form a first hot gas flow passage P1 between each other and between adjacent spacers 63. Thereby, the first hot gas flow passage P1 allows the combusted first hot gas to flow in the lean combustion zone LBA.

In addition, the inner surface of the inner pipe 64 forms the second hot gas flow passage P2 to flow the second hot gas. The flow of the second hot gas HG2 formed by the partial oxidation of the first hot gas HG1 and the second liquid fuel LF2 is kept warm by the flow of the first hot gas HG1 flowing through the first hot gas flow passage P1, thereby enabling high temperature flow of the second hot gas HG2. The second hot gas HG2 is a reformed gas containing hydrogen, carbon monoxide, and solid carbon.

Therefore, an inner wall surface of the inner pipe 64 that forms the second hot gas flow passage P2 maintains the reformed gas at a high temperature, and thus, adsorption of the solid carbon contained in the reformed gas to the inner wall surface may be minimized.

In addition, the inner pipe 64 is provided with guide ports 65 at end portions of the first and second hot gas flow passages P1 and P2 to guide the first hot gas HG1 through the first hot gas flow passage P1 to the second hot gas flow passage P2.

A plurality of the guide holes 65 are provided, and are disposed at equal intervals along the circumferential direction of the inner pipe 64 so that the first hot gas HG1 may be uniformly supplied to the second hot gas HG2. In addition, since the guide port 65 is formed to be adjacent to the reaction chamber 20, the first and second hot gases HG1 and HG2 may be supplied to the regeneration space S of the reaction chamber 20.

In this case, a spacer 66 may completely close and seal between the housing 61 and the inner pipe 64 in the circumferential direction, at end portions of the housing 61 and the inner pipe 64 in a length direction (adjacent to the reaction chamber 20).

In addition, a plurality of the spacers 66 may be provided, and may be disposed at equal intervals along the circumferential direction. In this case, the first hot gas HG1 may be supplied to the reaction chamber 20 through the first and second hot gas flow passages P1 and P2.

Referring back to FIG. 10, the first and second hot gases HG1 and HG2 supplied to the reaction chamber 20 through the second hot gas flow passage P2 or the first and second hot gas flow passages P1 and P2 of the liquid fuel reformer 60 are further combusted by the air supplied from the regeneration space S, and they combust the carbon on the surface of the coked catalyst to regenerate the catalyst and raise the temperature of the catalyst.

As described above, according to the second embodiment, the liquid fuel having a high calorific value is used to be reformed into a solid carbon and gaseous state and supplied to the reaction chamber 20, and thus, since the coked catalyst is reformed and the temperature of the catalyst is raised, the temperature balance is realized in the reaction chamber 20. That is, the occurrence of hot spots in the reaction chamber 20 is prevented.

The regenerated and heated catalyst exits through the outlet 21. For example, the regenerated catalyst that exits is used to mix the catalyst with naphtha to cause a decomposition reaction of the naphtha. In this process, the coked catalyst and the produced olefin are separated in a cyclone (not shown), and the coked catalyst is supplied to the catalyst regenerator 2 to be regenerated, heated, and reused.

Hereinafter, various types of the second embodiment of the present invention will be described. Descriptions of the same parts as those of the above-described embodiment and type will be omitted, and different parts will be described.

Figure 14:
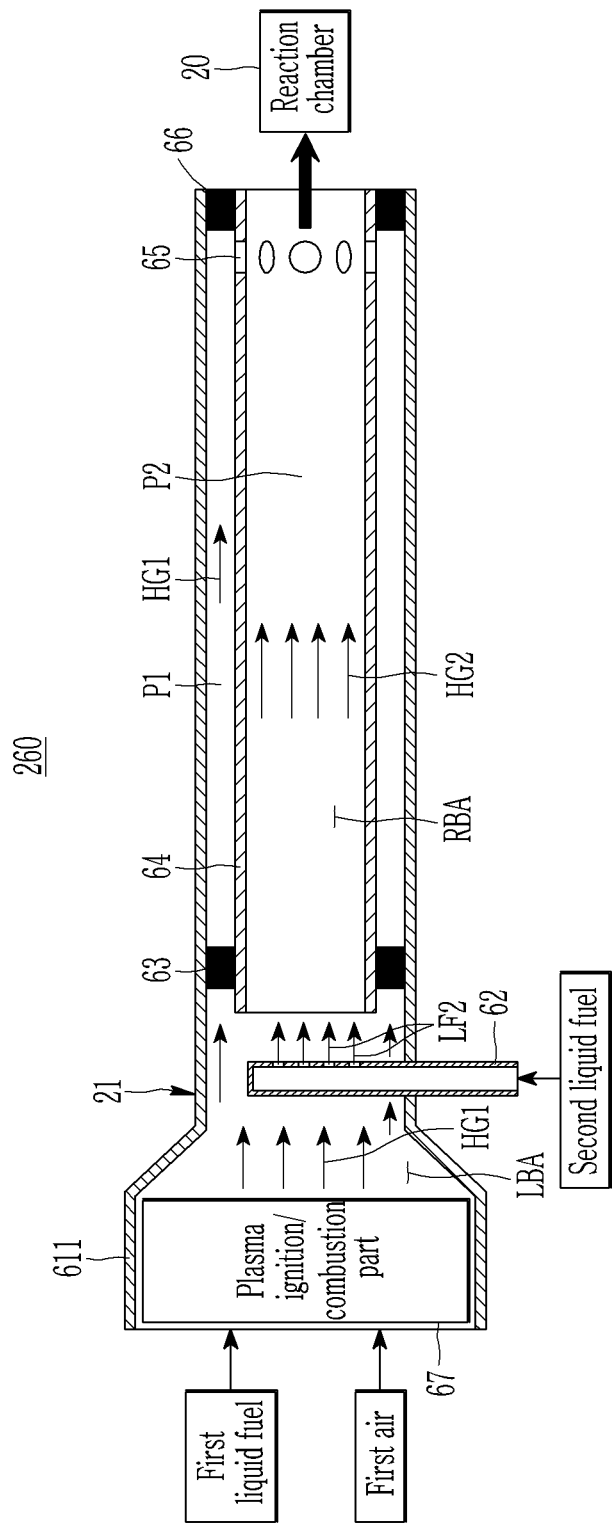
FIG. 14 illustrates a cross-sectional view of a liquid fuel reformer applied to a second type of a second embodiment of the present invention.

FIG. 14 illustrates a cross-sectional view of a liquid fuel reformer applied to a second type of a second embodiment of the present invention. Referring to FIG. 14, in a liquid fuel reformer 260 of the second type, the housing 61 further includes a plasma ignition/combustion part 67 in the extension 611 that is extended more in the lean combustion zone LBA than in the rich combustion zone RBA.

Since the plasma ignition/combustion part 67 generates plasma by the first liquid fuel and first air to act as ignition and combustion, compared to the first type described above, the first liquid fuel and first air realize leaner combustion, thereby realizing more stable combustion in the lean combustion zone LBA.

Therefore, compared to the first type, the second type of the second embodiment further enables the partial oxidation of the second liquid fuel LF2 supplied through the fuel supply pipe 62 in the rich combustion zone RBA, and generates the reformed gas containing hydrogen, carbon monoxide, and solid carbon to supply it to reaction chamber 20.

As such, since the second type uses the plasma ignition/combustion part 67 to stably implement combustion in the lean combustion zone LBA, the reformed gas containing the solid carbon generated by effectively implementing the partial oxidation in the rich combustion zone RBA is supplied to the reaction chamber 20 to reform the coked catalyst.

Therefore, compared to the first type, the second type further establishes the temperature balance in the reaction chamber 20, and further prevents the occurrence of hot spots in the reaction chamber 20.

Figure 15:
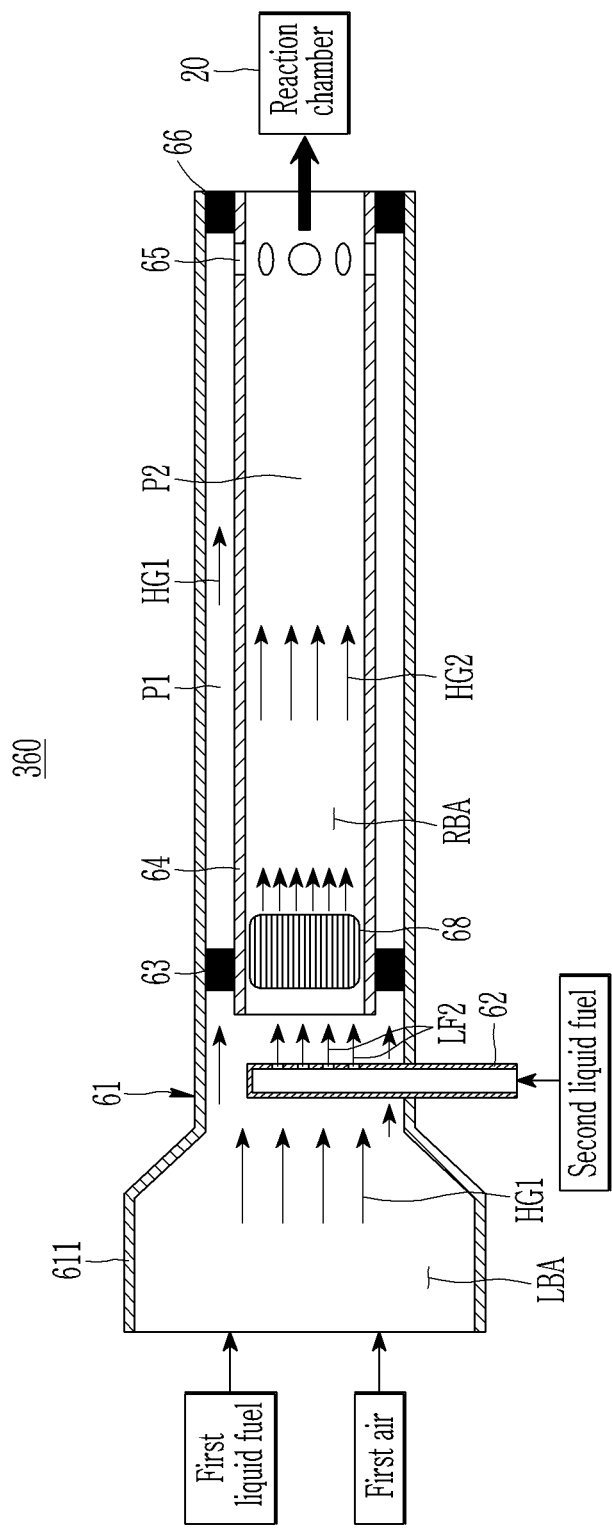
FIG. 15 illustrates a cross-sectional view of a liquid fuel reformer applied to a third type of a second embodiment of the present invention.

FIG. 15 illustrates a cross-sectional view of a liquid fuel reformer applied to a third type of a second embodiment of the present invention. Referring to FIG. 15, in a third type of liquid fuel reformer 360, the housing 61 includes a high temperature exposure increasing member 68 that is installed in the rich combustion zone RBA to increase a high temperature exposure time.

The high temperature exposure increasing member 68 has heat resistance. As an example, the high temperature exposure increasing member 68 may include at least one of a metal foam, a metal mesh, and a ceramic monolith.

The high temperature exposure increasing member 68 vaporizes and reforms the second liquid fuel LF2 by exposing the first hot gas flow of the first hot gas HG1 combusted in the lean combustion zone LBA and the second liquid fuel LF2 supplied to the fuel supply pipe 62 for a long time. Therefore, the liquid fuel reformer 360 supplies the reformed gas containing the hydrogen, carbon monoxide, and solid carbon partially oxidized in the lean combustion zone LBA to the reaction chamber 20.

As such, the third type uses the high temperature exposure increasing member 28 to effectively implement the partial oxidation in the rich combustion zone RBA, so that the reformed gas containing the generated solid carbon is supplied to the reaction chamber 20 to reform and heat the coked catalyst.

Therefore, compared to the first type, the third type may further establish the temperature balance in the reaction chamber 20, and may further prevent the occurrence of hot spots in the reaction chamber 20.

Figure 16:
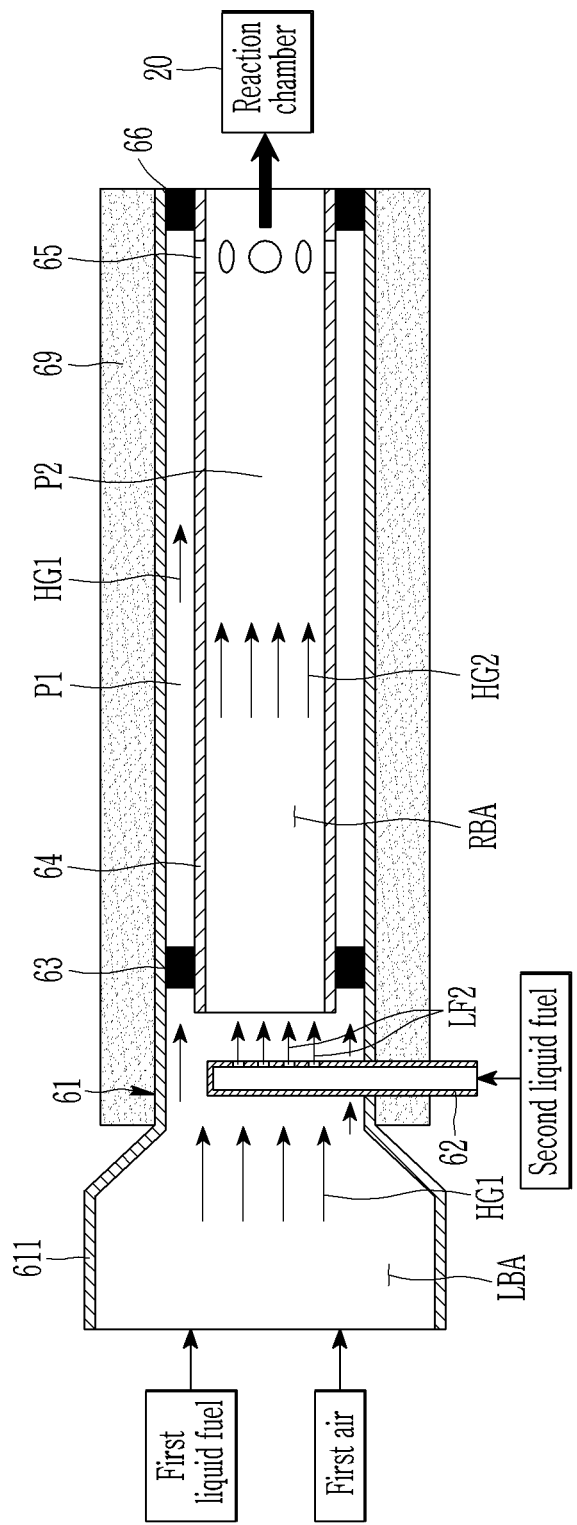
FIG. 16 illustrates a cross-sectional view of a liquid fuel reformer applied to a fourth type of a second embodiment of the present invention.

FIG. 16 illustrates a cross-sectional view of a liquid fuel reformer applied to a fourth type of a second embodiment of the present invention. Referring to FIG. 16, a liquid fuel reformer 460 of the fourth type further includes a heating member 69 that is installed on the outer surface of the housing 61 to increase the internal temperature.

As an example, the heating member 69 may include a heat insulating material, an electric heater, or a heat exchanger. More specifically, the heating member 69 may be installed in the rich combustion zone RBA of the housing 61. The heating member 69 heats the inside of the inner pipe 24 when reforming the second liquid fuel in the rich combustion zone RBA.

The solid carbon has the characteristic of not adsorbing and growing on the inner surface of the inner pipe 64 as the temperature increases. Therefore, the heating member 69 raises the temperature in the inner pipe 64 to prevent the solid carbon from being adsorbed to the inner surface of the inner pipe 64 during the partial oxidation of the second liquid fuel LF2. The adsorption of the solid carbon to the inner surface of the inner pipe 64 is most affected by temperature.

As such, the fourth type uses the heating member 69 to effectively implement the partial oxidation in the rich combustion zone RBA, so that the reformed gas containing the generated solid carbon is supplied to the reaction chamber 20 to regenerate and heat the coked catalyst.

Therefore, compared to the first type, the fourth type may further establish the temperature balance in the reaction chamber 20, and may further prevent the occurrence of hot spots in the reaction chamber 20.

Figure 17:
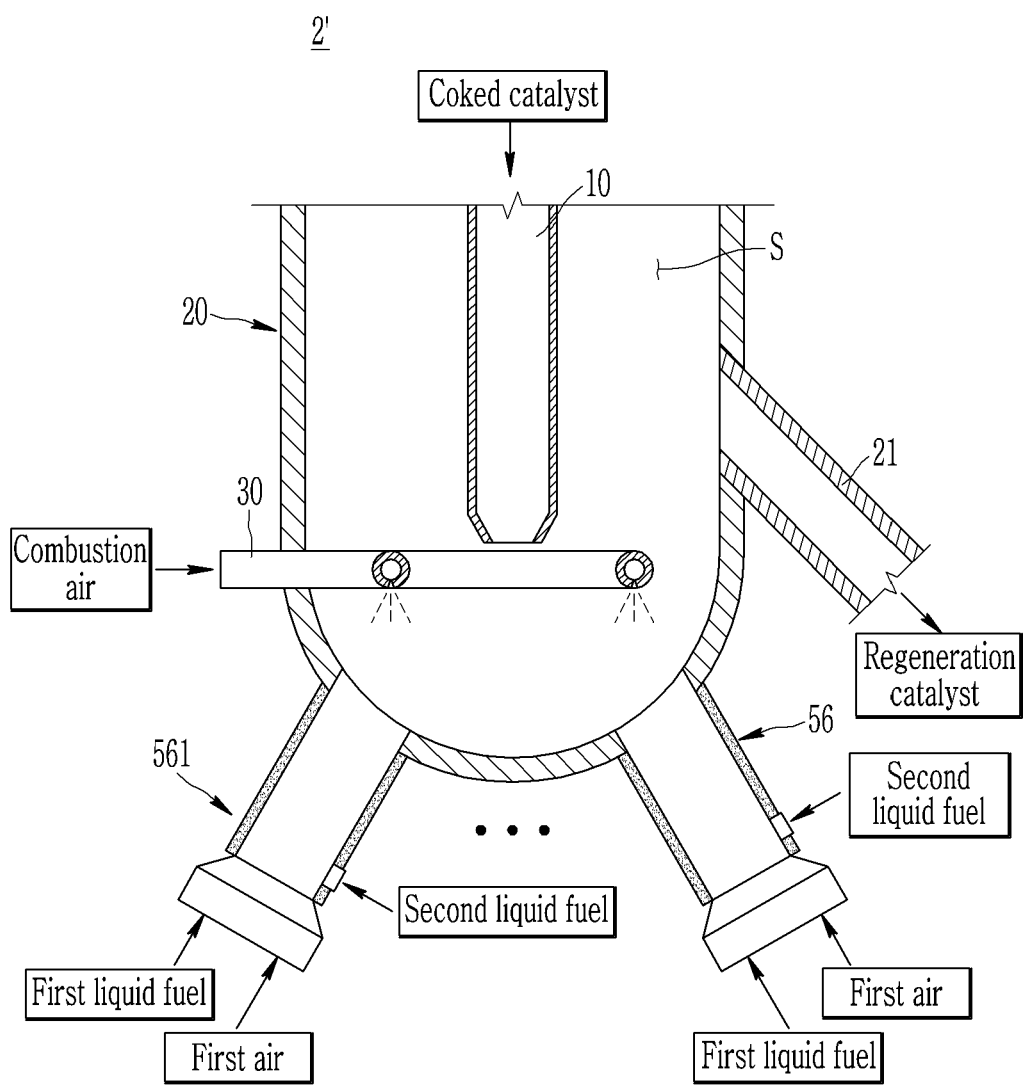
FIG. 17 illustrates a cross-sectional view of a catalyst regenerator including a liquid fuel reformer applied to a fifth type of a second embodiment of the present invention.

FIG. 17 illustrates a cross-sectional view of a catalyst regenerator including a liquid fuel reformer applied to a fifth type of a second embodiment of the present invention. Referring to FIG. 17, in the fifth type of catalyst regenerator 2', a plurality of liquid fuel reformers are disposed under the reaction chamber 20.

For example, N liquid fuel reformers 561 to 56N may be included. In this case, the N liquid fuel reformers 561 to 56N supply the reformed gas that contains the solid carbon as a main component and other gases to the regeneration space S in the reaction chamber 20 to be combusted by air in the regeneration space S and combust the carbon on the surface of the coked catalyst to regenerate the catalyst and raise the temperature of the catalyst.

Figure 18:
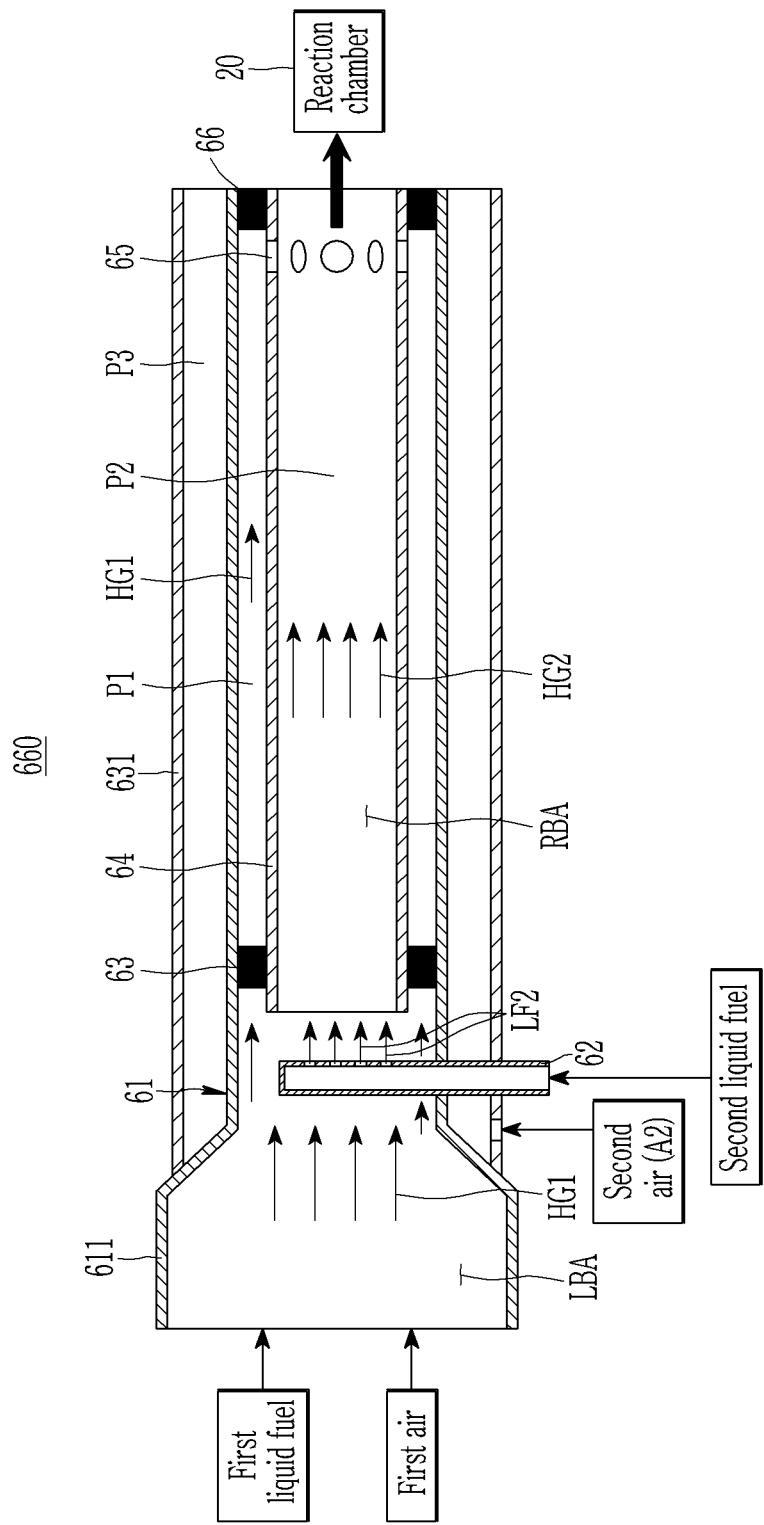
FIG. 18 illustrates a cross-sectional view of a liquid fuel reformer applied to a sixth type of a second embodiment of the present invention.

FIG. 18 illustrates a cross-sectional view of a liquid fuel reformer applied to a sixth type of a second embodiment of the present invention. Referring to FIG. 18, a sixth type of liquid fuel reformer 660 includes an outer pipe 631 installed outside the housing 61 in the rich combustion zone RBA.

An outer surface of the housing 61 and an inner surface of the outer pipe 631 form a second air flow passage P3 between them to allow second air A2 to flow.

Since the second air A2 supplied through the second air flow passage P3 cools the outer surface of the housing 61 when the temperature of the rich combustion zone RBA becomes excessively high according to a mixing ratio of the first liquid fuel, the second liquid fuel LF2, and the first air, the temperature of the second hot gas flow passage P2 formed on the inner surface of the inner pipe 64 may be stably maintained and implemented.

Hereinafter, a third embodiment of the present invention will be described. The third embodiment has a pre-mixer to prevent after-burning in the catalyst lean zone.

Figure 19:
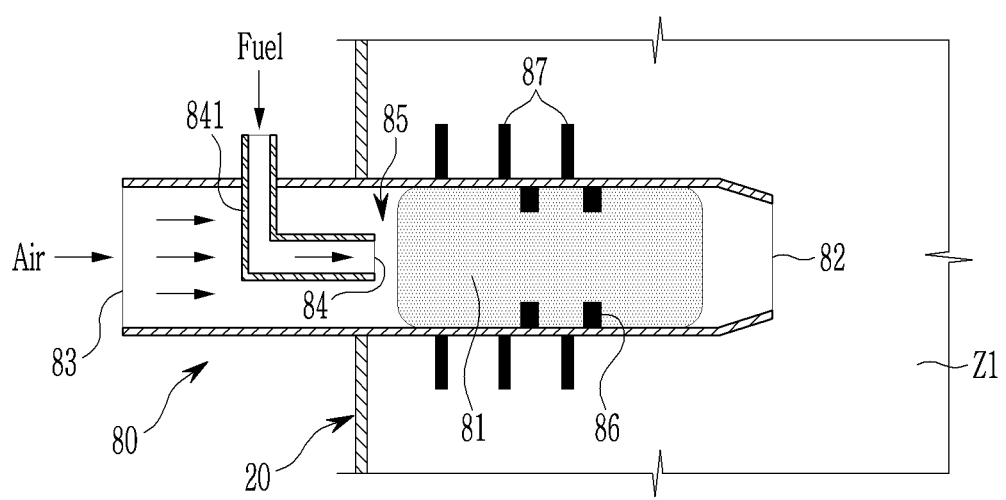
FIG. 19 illustrates a schematic view of a combustion reaction nozzle applied to a catalyst regenerator of a third embodiment of the present invention.

FIG. 19 illustrates a schematic view of a combustion reaction nozzle applied to a catalyst regenerator of a third embodiment of the present invention. Referring to FIG. 19, the catalyst regenerator of the third embodiment includes a combustion reactant nozzle 80 as a pre-mixer for preventing after-burning in the catalyst lean zone.

Referring to FIG. 19, the combustion reactant nozzle 80 may be installed to extend from the outside to the inside of the reaction chamber 20 as an example, and a pre-mixing zone 81 and an outlet 82 are positioned in the catalyst dense zone Z1. Therefore, the pre-mixing zone 81 and the catalyst dense zone Z1 exchange heat with each other.

The combustion reactant nozzle 80 pre-mixes the supplied fuel and air in the pre-mixing zone 81, and injects the combustion reactant generated by the reaction into the catalyst dense zone Z1 of the reaction chamber 20.

The reaction chamber 20 forms the catalyst dense zone Z1 of the lower portion (upstream of the flow field) in which the coked catalyst accumulates and the catalyst lean zone Z2 of the upper portion (downstream of the flow field) (see FIG. 1).

The combustion reactant nozzle 80 sprays and supplies the combustion reactant generated by pre-mixing and reacting fuel and air in the pre-mixing zone 81 to the catalyst dense zone Z1 in the reaction chamber 20, so that stable combustion occurs in the catalyst dense zone Z1, carbon on the coked catalyst surface is removed, and thereby the after-burning in the catalyst lean zone Z2 may be prevented.

Referring to FIG. 19, in the used combustion reactant nozzle 80, the outlet 82 side of the pre-mixing zone 81 is positioned in the catalyst dense zone Z1 inside the reaction chamber 20.

Therefore, the combustion reactant generated by the pre-mixing and reaction are directly injected into the catalyst dense zone Z1 of the reaction chamber 20 through the outlet 82 of the combustion reactant nozzle 80, and is used for regeneration of the coked catalyst.

The combustion reactant nozzle 80 includes an air nozzle 83 to inject air and a fuel nozzle 84 to supply fuel. The air nozzle 83 and the fuel nozzle 84 are connected to an inlet 85 side of the pre-mixing zone 81.

A fuel pipe 841 connected to the fuel nozzle 84 is installed to extend from the outside to the inside of the combustion reactant nozzle 80 connected to the air nozzle 83, and injects fuel into injected air. That is, the fuel pipe 841 and the air nozzle 83 form a double structure.

The combustion reactant nozzle 80 may further include a mixing member 86. For example, the mixing member 86 may include one of an orifice, a swirl vane, and a swirl blade. The mixing member 86 is provided on an inner surface of the combustion reactant nozzle 80 forming the pre-mixing zone 81 to promote pre-mixing of the injected air and fuel.

The combustion reactant nozzle 80 may further include a heat dissipating fin 87. The heat dissipating fin 87 is provided on an outer surface thereof forming the pre-mixing zone 81 to promote heat exchange between the pre-mixing zone 81 inside and the catalyst dense zone Z1 outside.

The combustion reactant nozzle 80 may be provided with one of the mixing member 86 and the heat dissipating fin 87 to promote pre-mixing or heat exchange, or may be provided with both the mixing member 86 and the heat dissipating fin 87 to simultaneously promote pre-mixing and heat exchange.

Hereinafter, various types of the third embodiment of the present invention will be described. In comparison with the above-described embodiments and types, descriptions of the same configurations are omitted, and different configurations will be described.

Figure 20:
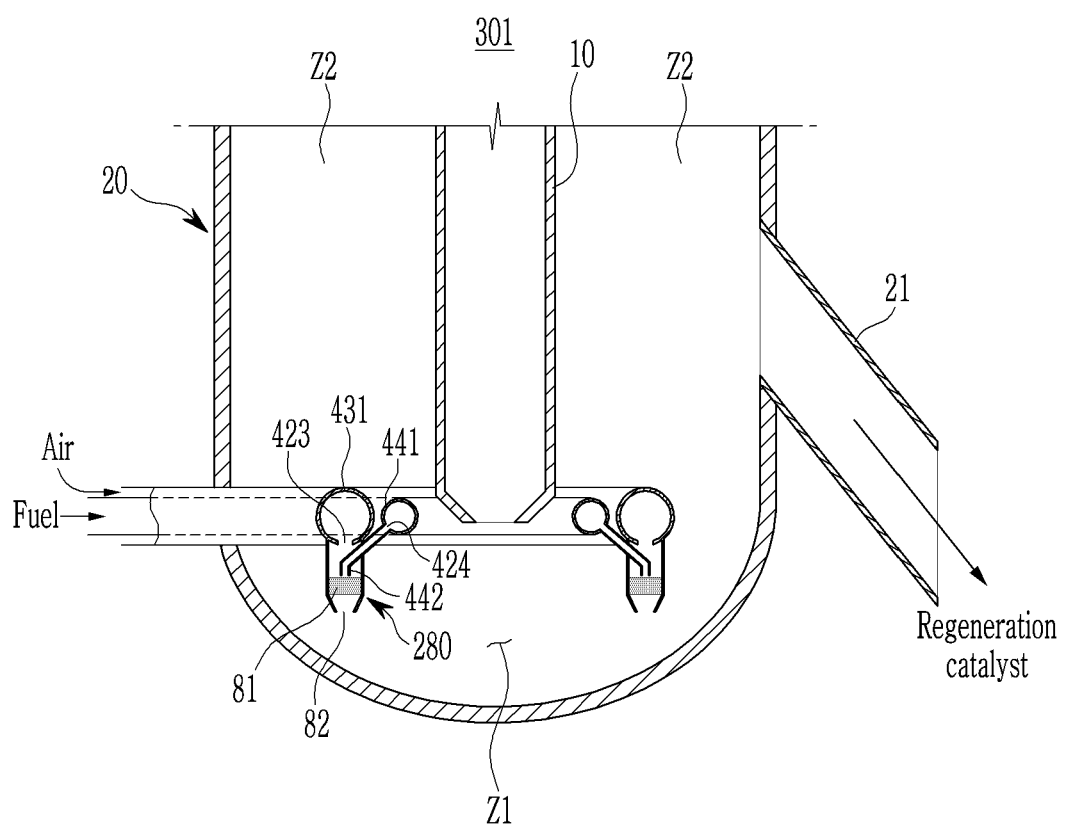
FIG. 20 illustrates a schematic view of a catalyst regenerator according to a first type of a third embodiment of the present invention.

FIG. 20 illustrates a schematic view of a catalyst regenerator according to a first type of a third embodiment of the present invention. Referring to FIG. 20, a catalyst regenerator 301 according to the first type of the third embodiment is provided with a combustion reactant nozzle 280. The combustion reactant nozzle 280 is installed inside the reaction chamber 20, and the pre-mixing zone 81 and the outlet 82 are positioned in the catalyst dense zone Z1.

The coked catalyst falls into the reaction chamber 20 through the standpipe 10 installed inside the reaction chamber 20. In addition, the catalyst regenerated in the reaction chamber 20 is discharged to the outside of the reaction chamber 20 via the outlet 21.

By this series of processes, a flow field is formed in the reaction chamber 20 from a lower portion (upstream zone of the flow field) to an upper portion (downstream zone of the flow field). The upstream zone of the flow field is formed in the lower catalyst dense zone Z1, and the downstream zone of the flow field is formed in the upper catalyst lean zone Z2.

The catalyst regenerator 301 includes an air distribution ring 431 for supplying air and a fuel distribution ring 441 for supplying fuel. The air distribution ring 431 and the fuel distribution ring 441 are each independently installed inside the reaction chamber 20. The air distribution ring 431 and the fuel distribution ring 441 are drawn out to the outside of the reaction chamber 20 to distribute air and fuel supplied from the outside to the inside of the reaction chamber 20, respectively.

The air distribution ring 431 is provided with an air injection port 423 for injecting air, and the fuel distribution ring 441 is provided with a fuel injection port 424 for injecting fuel. The air injection port 423 is the air nozzle 83 (see FIG. 19) or is connected to the air nozzle, and the fuel injection port 424 is connected to the fuel nozzle 84. Accordingly, the air injection port 423 and the fuel injection port 424 are connected to the inlet side of the pre-mixing zone 81 to inject air and fuel to the pre-mixing zone 81, respectively.

That is, the air injection port 423 is connected to the inlet side of the combustion reactant nozzle 280, and a fuel connection pipe 442 connected to the fuel injection port 424 is installed to extend from the outside to the inside of the combustion reactant nozzle 280 connected to the air injection port 423 to inject fuel into injected air. Here, the fuel connection pipe 442 may be the fuel pipe 841 of FIG. 19, and a fuel connection pipe 552 of a second type to be described later is the same.

A plurality of the air injection ports 423, a plurality of the fuel injection ports 424, and a plurality of the fuel connection pipes 442 are provided, and are disposed to be spaced apart from each other at predetermined intervals in the air distribution ring 431 and the fuel distribution ring 441. Corresponding to this, a plurality of combustion reaction nozzles 280 are provided. For convenience, FIG. 20 exemplarily illustrates two combustion reactant nozzles 280.

The combustion reactant nozzle 280 including the pre-mixing zone 81 supplies the combustion reactant by the pre-mixing and reaction of air and fuel into the catalyst dense zone Z1 around the combustion reactant nozzle 280.

In this case, the catalyst regenerator 301 implements stable combustion in the catalyst dense zone Z1, and does not generate an after-burning phenomenon in the catalyst lean zone Z2 set at an upper portion of the catalyst dense zone Z1. Since the outlet 82 injects the combustion reactant toward the lower portion of the reaction chamber 20, more stable combustion may be realized in the catalyst dense zone Z1.

Figure 21:
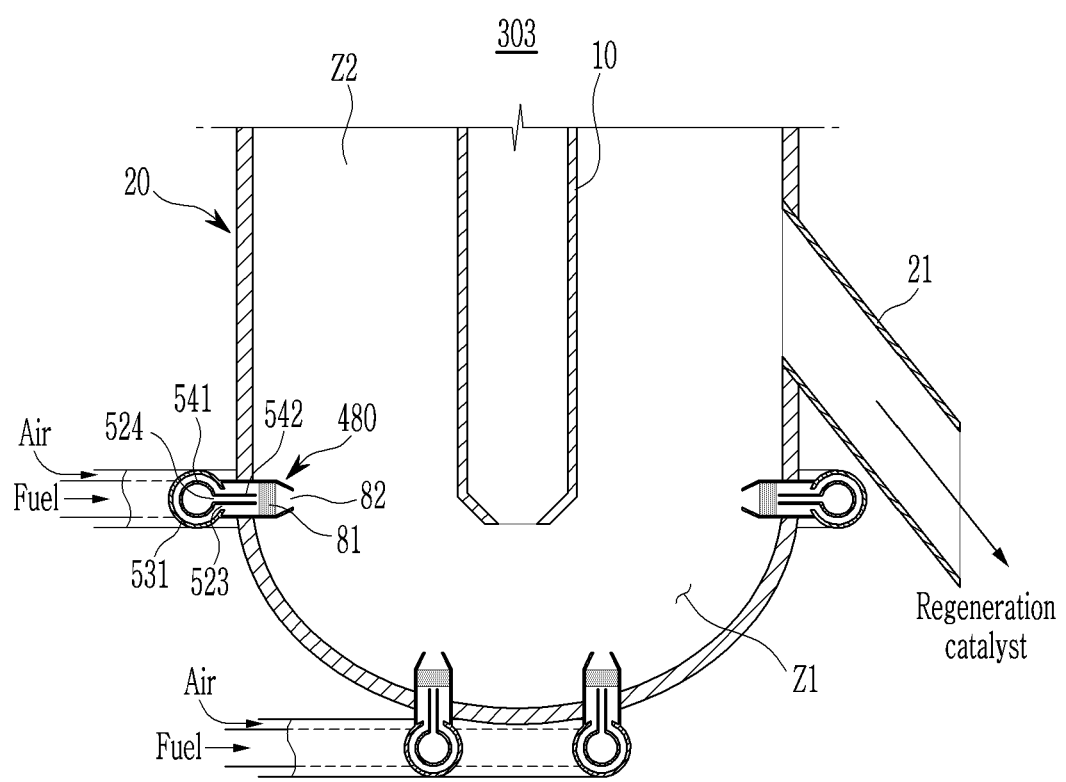
FIG. 21 illustrates a schematic view of a catalyst regenerator according to a second type of a third embodiment of the present invention.

FIG. 21 illustrates a schematic view of a catalyst regenerator according to a second type of a third embodiment of the present invention. Referring to FIG. 21, a combustion reactant nozzle 480 of a second type of catalyst regenerator 303 is installed to extend from the outside to the inside of the reaction chamber 20, and the outlet 82 thereof is connected to the catalyst dense zone Z1. The fuel distribution ring 551 is installed inside an air distribution ring 531 outside the reaction chamber 20 to form a double structure with the air distribution ring 531.

A plurality of sets of the combustion reactant nozzles 480 are provided and a plurality of the combustion reactant nozzles 480 are provided in each set, and one set is upwardly installed at a lower portion of the reaction chamber 20 and the other set is installed toward a center at the side portion of the reaction chamber 20.

Depending on a size of the catalyst dense zone Z1, the sets of the combustion reactant nozzles 480 may be installed in greater numbers and at various angles. Therefore, the combustion reactant nozzle 480 may effectively inject the combustion reactant into the catalyst dense zone Z1.

An air injection port 523 is connected to the inlet side of the combustion reactant nozzle 480, and the fuel connection pipe 442 connected to a fuel injection port 524 is installed inside the combustion reactant nozzle 480 connected to the air injection port 523 to form a dual structure with the combustion reactant nozzle 480 to inject fuel into injected air.

The fuel injected through the fuel injection port 524 is supplied through the fuel connection pipe 442, and is injected into the pre-mixing zone 81 while exchanging heat with air due to the dual structure of the fuel connection pipe 442 and the combustion reactant nozzle 480. In the pre-mixing zone 81, the fuel and air may be effectively pre-mixed.

The combustion reactant nozzle 480 including the pre-mixing zone 81 supplies the combustion reactant by the pre-mixing and reaction of air and fuel via the dual structure into the catalyst dense zone Z1 around the combustion reactant nozzle 480.

In this case, the catalyst regenerator 303 implements more stable combustion in the catalyst dense zone Z1, and does not generate an after-burning phenomenon in the catalyst lean zone Z2 set at an upper portion of the catalyst dense zone Z1. Since the outlet 82 injects the combustion reactant in various numbers and angles to the catalyst dense zone Z1, more stable combustion may be realized in the catalyst dense zone Z1.

Figure 22:
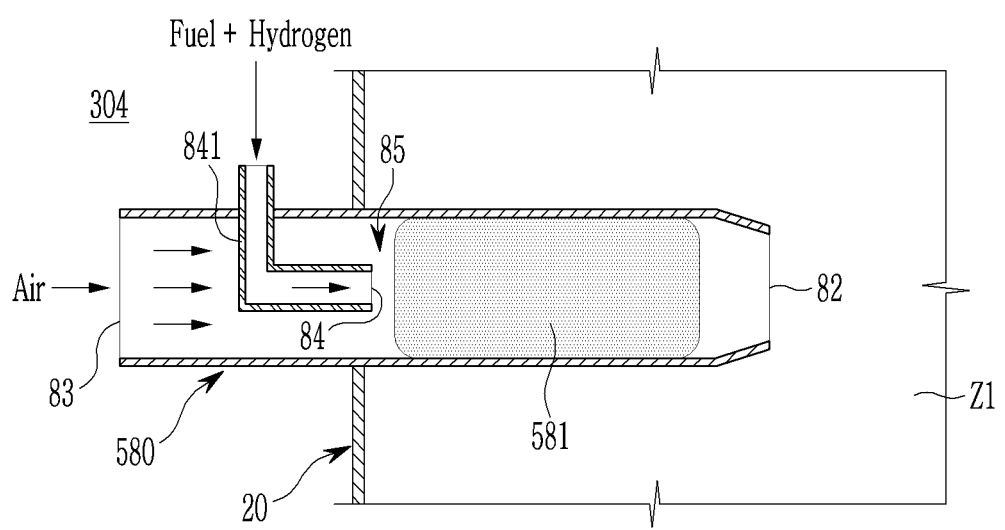
FIG. 22 illustrates a schematic view of a catalyst regenerator according to a third type of a third embodiment of the present invention.

FIG. 22 illustrates a schematic view of a catalyst regenerator according to a third type of a third embodiment of the present invention. Referring to FIG. 22, since fuel in which hydrogen is included is supplied by a combustion reactant nozzle 580 of a third type of catalyst regenerator 304, the fuel, hydrogen, and air are pre-mixed and combusted in the pre-mixing zone 581.

The air nozzle 83 and the fuel nozzle 84 are connected to the inlet side of the pre-mixing zone 581 to inject air, fuel, and hydrogen into the pre-mixing zone 581. The combustion reactant nozzle 580 supplies the combustion reactant by the pre-mixing and combustion of the air, fuel, and hydrogen into the catalyst dense zone Z1 around the combustion reactant nozzle 580. The hydrogen contained in the fuel accelerates the combustion reaction.

In this case, the catalyst regenerator 304 implements more stable combustion in the catalyst dense zone Z1, and does not generate an after-burning phenomenon in the catalyst lean zone Z2 set at an upper portion of the catalyst dense zone Z1.

In addition, compared to the first type of combustion reactant nozzle 80 (see FIG. 19), the combustion reactant nozzle 580 does not include the mixing member 86 or the heat dissipating fin 87, and includes the minimum constituent elements for generating the combustion reactant.

Figure 23:
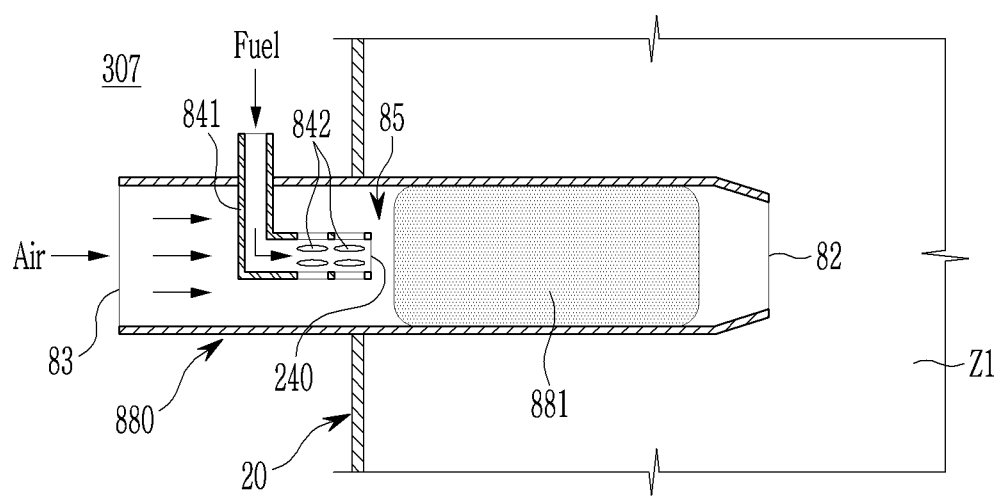
FIG. 23 illustrates a schematic view of a catalyst regenerator according to a fourth type of a third embodiment of the present invention.

FIG. 23 illustrates a schematic view of a catalyst regenerator according to a fourth type of a third embodiment of the present invention. Referring to FIG. 23, in a fourth type of catalyst regenerator 307, a fuel pipe 841 of a combustion reactant nozzle 880 is provided with a porous portion 842 around a fuel nozzle 840.

The fuel pipe 841 connected to the fuel nozzle 840 is installed to extend from the outside to the inside of the combustion reactant nozzle 880 connected to the air nozzle 83, and injects fuel into injected air. That is, the fuel pipe 841 and the air nozzle 83 form a double structure.

The air injected from the air nozzle 83 inflows into the porous portion 842 and is mixed and injected with the fuel by the fuel nozzle 840, or the fuel injected from the fuel nozzle 840 flows out to the porous portion 842 and is mixed with the air in the air nozzle 83 to be sprayed into a pre-mixing zone 881.

That is, the porous portion 842 enables the fuel to flow out or the air to flow in depending on the injection pressure, thereby accelerating the mixing of the fuel and air. Therefore, the porous portion 842 may further promote the pre-mixing of the air and fuel in the pre-mixing zone 881.

The combustion reactant nozzle 880 including the pre-mixing zone 881 supplies the combustion reactant by the pre-mixing and reaction of the air and fuel via the dual structure and the porous portion 842 into the catalyst dense zone Z1 around the combustion reactant nozzle 880.

In this case, the catalyst regenerator 307 implements stable combustion in the catalyst dense zone Z1, and does not generate an after-burning phenomenon in the catalyst lean zone Z2 set at an upper portion of the catalyst dense zone Z1.

Figure 24:
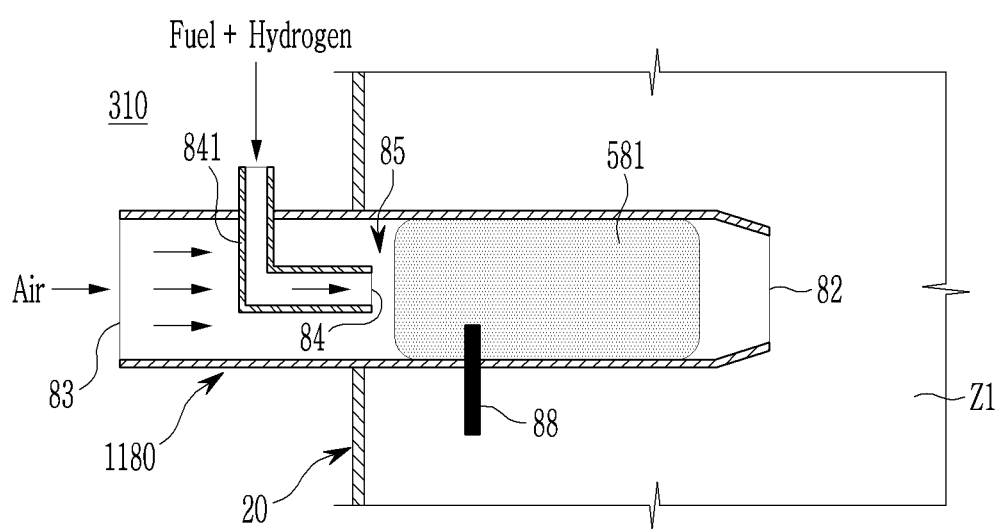
FIG. 24 illustrates a schematic view of a combustion reaction nozzle applied to a fluidized bed catalyst regenerator according to a fifth type of a third embodiment of the present invention.

FIG. 24 illustrates a schematic view of a combustion reaction nozzle applied to a fluidized bed catalyst regenerator according to a fifth type of a third embodiment of the present invention. Referring to FIG. 24, in a fifth type of catalyst regenerator 310, a combustion reactant nozzle 1180 further includes an igniter 88, compared to the third type of combustion reactant nozzle 580 (see FIG. 22).

That is, the combustion reactant nozzle 1180 may include the igniter 88 in the pre-mixing zone 581 as needed to further promote the pre-mixing and reaction of the fuel, hydrogen, and air in the pre-mixing zone 581. For example, the igniter 88 may be configured as one of a plasma igniter, a spark igniter, and a glow igniter.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | | | |
|---|---|---|---|
| 1, 1', 2, 2', 301, 303, 304, 307, 310: | catalyst regenerator | | |
| 10: | standpipe | 20: | reaction chamber |
| 21: | outlet | 22: | perforated plate |
| 23: | bottom | 30: | air supplier |
| 31: | air distribution ring | 32: | air injection port |
| 40, 240, 340, 440, 540, 640: | auto-thermal reforming reactor | | |
| 41: | reforming container | 42: | reforming catalyst |
| 50: | gaseous fuel supplier | 51: | fuel distribution ring |
| 52: | fuel injection port | 311: | air pipe |
| 344: | pilot burner or igniter | 411: | Connection pipe |
| 444: | external combustor | 541, 542: | first, second mixer |
| 543, 643: | water supplier | 642: | mixer |
| 644: | heat exchanger | 61: | housing |
| 10, 260, 360, 460, 561-56N, 660: | liquid fuel reformer | | |
| 62: | fuel supply pipe | 63, 66: | spacer |
| 64: | inner pipe | 65: | guide port |
| 67: | plasma ignition/combustion part | | |
| 68: | high temperature exposure increasing member | | |
| 69: | heating member | 631: | outer pipe |
| 611: | extension | | |
| 80, 280, 480, 580, 880, 1180: | combustion reactant nozzle | | |
| 81, 581, 881: | pre-mixing zone | | |
| 82: outlet 83: | air nozzle | | |
| 84, 840: | fuel nozzle | 85: | inlet |
| 86: | mixing member | 87: | heat dissipating fin |
| 88: | igniter | | |

The invention claimed is:

1. A catalyst regenerator for regenerating a coked catalyst separated from a product produced in an endothermic catalytic reaction of a fluidized bed reactor, comprising:
   a reaction chamber including a regeneration space, the reaction chamber configured to receive the coked catalyst from a standpipe connected to the regeneration space, and discharge a regenerated catalyst to an outlet;
   a fuel supplier connected to the reaction chamber to inject a fuel for combustion into the regeneration space; and
   an air supplier connected to the reaction chamber to inject air for combustion into the regeneration space,
   wherein
   the fuel injected from the fuel supplier is a reformed fuel containing hydrogen and carbon monoxide, and
   the fuel supplier further includes an auto-thermal reforming reactor that is provided with a reforming container in which a reforming catalyst is embedded, and receives a separated gaseous fuel separated from a product of the endothermic catalytic reaction to auto-thermally reforming-react it in the reforming catalyst.

2. The catalyst regenerator of claim 1, wherein
the air supplier includes an air distribution ring supplied with the air and an air nozzle formed in the air distribution ring, and
the fuel supplier includes a fuel distribution ring supplied with the fuel and disposed to be adjacent to the air distribution ring and a fuel injection port formed in the fuel distribution ring.

3. The catalyst regenerator of claim 2, wherein
the outlet is installed at a predetermined height from a bottom of the reaction chamber, and
the regeneration space includes a catalyst dense zone set at a lower height than the outlet and a catalyst lean zone set at an upper side of the outlet.

4. The catalyst regenerator of claim 1, wherein
the auto-thermal reforming reactor further receives air and water.

5. The catalyst regenerator of claim 1, wherein
the auto-thermal reforming reactor further receives external gaseous fuel from the outside.

6. The catalyst regenerator of claim 1, wherein
the auto-thermal reforming reactor includes a pilot burner or igniter in the reforming container.

7. The catalyst regenerator of claim 1, wherein
in the auto-thermal reforming reactor,
an external combustor supplying a hot combustion product gas is connected to the reforming container.

8. The catalyst regenerator of claim 4, wherein
the auto-thermal reforming reactor includes
a first mixer provided in the reforming container to mix the separated gaseous fuel and the air,
a water supplier provided at a downstream side of the first mixer to spray water supplied to the reforming container, and
a second mixer provided between the reforming catalyst embedded in the reforming container and the water supplier to mix the separated gaseous fuel with the air and the water.

9. The catalyst regenerator of claim 4, wherein
the auto-thermal reforming reactor includes
a mixer provided in the reforming container to mix the separated gaseous fuel and the air, and
a water supplier provided between the reforming catalyst embedded in the reforming container and the mixer to spray water supplied to the reforming container.

10. The catalyst regenerator of claim 9, wherein
the water supplier includes a heat exchanger exchanging heat inside the reforming container.

11. The catalyst regenerator of claim 1, wherein
the auto-thermal reforming reactor is installed in the regeneration space.

12. The catalyst regenerator of claim 3, wherein
the reaction chamber includes a perforated plate at the upper side of the fuel distribution ring, and
the perforated plate is provided as a single layer or a multilayer in the catalyst dense zone.

13. A catalyst regenerator for regenerating a coked catalyst separated from a product produced in an endothermic catalytic reaction of a fluidized bed reactor, comprising:
a reaction chamber including a regeneration space, the reaction chamber configured to receive the coked catalyst from a standpipe connected to the regeneration space, and discharge a regenerated catalyst to an outlet;
a fuel supplier connected to the reaction chamber to inject a fuel for combustion into the regeneration space; and
an air supplier connected to the reaction chamber to inject air for combustion into the regeneration space,
wherein
the fuel injected from the fuel supplier is a reformed fuel containing hydrogen and carbon monoxide,
the fuel supplier includes a liquid fuel reformer that is connected to the reaction chamber to generate a reformed gas including hydrogen, carbon monoxide, and solid carbon by partial oxidation of liquid fuel and supply it to the regeneration space, and
the liquid fuel reformer includes
a housing connected to the reaction chamber,
a lean combustion zone in which a first hot gas flow is formed with a first liquid fuel and first air supplied from one side of the housing, and
a rich combustion zone in which a second hot gas flow is formed with a second liquid fuel supplied through a fuel supply pipe installed inside the lean combustion zone.

14. The catalyst regenerator of claim 13, further comprising
an inner pipe installed through a spacer interposed inside the housing, in the rich combustion zone.

15. The catalyst regenerator of claim 14, wherein
a first hot gas flow passage that allows the first hot gas to flow is formed between an outer surface of the inner pipe and an inner surface of the housing, and
an inner surface of the inner pipe forms a second hot gas flow passage that allows the second hot gas to flow.

16. The catalyst regenerator of claim 13, further comprising
an outer pipe installed outside the housing.

17. The catalyst regenerator of claim 16, wherein
a second air flow passage that allows second air to flow is formed between an outer surface of the housing and an inner surface of the outer pipe.

18. The catalyst regenerator of claim 13, wherein
the housing includes an extension that is more largely extended in the lean combustion zone than in the rich combustion zone, and
a plasma ignition/combustion part that is installed in the extension to generate plasma by a first liquid fuel and first air, and ignites/combusts.

19. The catalyst regenerator of claim 13, wherein
the housing includes a high temperature exposure increasing member installed in the rich combustion zone to increase a high temperature exposure time.

20. The catalyst regenerator of claim 19, wherein
the high temperature exposure increasing member includes at least one of a metal foam, a metal mesh, and a ceramic monolith.

21. The catalyst regenerator of claim 13, wherein
the housing includes a heating member installed on an outer surface thereof to increase an internal temperature.

22. The catalyst regenerator of claim 13, wherein
a plurality of the liquid fuel reformers are disposed in a lower side of the reaction chamber.

23. A catalyst regenerator for regenerating a coked catalyst separated from a product produced in an endothermic catalytic reaction of a fluidized bed reactor, comprising:
a reaction chamber including a regeneration space, the reaction chamber configured to receive the coked catalyst from a standpipe connected to the regeneration space, and discharge a regenerated catalyst to an outlet;
a fuel supplier connected to the reaction chamber to inject a fuel for combustion into the regeneration space; and
an air supplier connected to the reaction chamber to inject air for combustion into the regeneration space,
wherein
the fuel injected from the fuel supplier is a reformed fuel containing hydrogen and carbon monoxide,
the air supplier includes an air distribution ring supplied with the air and an air nozzle formed in the air distribution ring,
the fuel supplier includes a fuel distribution ring supplied with the fuel and disposed to be adjacent to the air distribution ring and a fuel injection port formed in the fuel distribution ring
the outlet is installed at a predetermined height from a bottom of the reaction chamber,
the regeneration space includes a catalyst dense zone set at a lower height than the outlet and a catalyst lean zone set at an upper side of the outlet, and
the catalyst regenerator further comprises a pre-mixer provided with a pre-mixing zone that is disposed in the catalyst dense zone and pre-mixes a fuel supplied from the fuel supplier and air supplied from the air supplier.

24. The catalyst regenerator of claim 23, wherein
the pre-mixer is a combustion reactant nozzle that injects a combustion reactant generated in the pre-mixing zone into the catalyst dense zone,
the combustion reactant nozzle includes an air nozzle connected to the air injection port and a fuel nozzle connected to the fuel injection port, and
the air nozzle and the fuel nozzle are connected to an inlet side of the pre-mixing zone.

25. The catalyst regenerator of claim 24, wherein
a fuel connection pipe connecting the fuel injection port and the fuel nozzle is installed to extend from the outside to the inside of the combustion reactant nozzle connected to the air nozzle to inject a fuel into sprayed air.

26. The catalyst regenerator of claim 24, further comprising
a fuel pipe including a porous portion formed around the fuel nozzle.

27. The catalyst regenerator of claim 24, wherein
the combustion reactant nozzle further includes an igniter installed in the pre-mixing zone.

28. The catalyst regenerator of claim 25, wherein
the air distribution ring and the fuel distribution ring are respectively independently installed inside the reaction chamber.

* * * * *